(12) United States Patent
Eksteen et al.

(10) Patent No.: US 10,480,046 B2
(45) Date of Patent: Nov. 19, 2019

(54) PROCESS FOR COPPER AND/OR PRECIOUS METAL RECOVERY

(71) Applicant: CURTIN UNIVERSITY OF TECHNOLOGY, Bentley WA (AU)

(72) Inventors: Jacobus Johannes Eksteen, Bull Creek WA (AU); Elsayed Abdelrady Oraby, Cannington WA (AU)

(73) Assignee: CURTIN UNIVERSITY OF TECHNOLOGY, Bentley, Western Australia (AU)

( * ) Notice: Subject to any disclaimer, the term of this patent is extended or adjusted under 35 U.S.C. 154(b) by 144 days.

(21) Appl. No.: 14/915,889

(22) PCT Filed: Sep. 4, 2014

(86) PCT No.: PCT/AU2014/000877
§ 371 (c)(1),
(2) Date: Mar. 1, 2016

(87) PCT Pub. No.: WO2015/031943
PCT Pub. Date: Mar. 12, 2015

(65) Prior Publication Data
US 2016/0194734 A1    Jul. 7, 2016

(30) Foreign Application Priority Data

Sep. 4, 2013    (AU) .................................. 2013903380
Jun. 23, 2014   (AU) .................................. 2014902389

(51) Int. Cl.
*C22B 3/00*    (2006.01)
*C22B 3/12*    (2006.01)
(Continued)

(52) U.S. Cl.
CPC ............ *C22B 15/0065* (2013.01); *C22B 3/12* (2013.01); *C22B 3/16* (2013.01); *C22B 3/165* (2013.01);
(Continued)

(58) Field of Classification Search
CPC .. C22B 3/16; C22B 11/04; C22B 3/12; C22B 3/14; C22B 15/0065; C22B 15/008
See application file for complete search history.

(56) References Cited

U.S. PATENT DOCUMENTS 3,843,567 A * 10/1974 Matsunaga ............... C02F 1/26
                                                     521/28
3,865,580 A *  2/1975 Hummel .................. C01G 3/14
                                                      299/5

(Continued)

FOREIGN PATENT DOCUMENTS

BG          61002 B1 *  8/1996
CA       2648491 A1    10/2007
(Continued)

OTHER PUBLICATIONS

Spasova, Irena et al. "Leaching of Gold From a Polymetallic Sulphide Ore." Annual of the University of Mining and Geology, vol. 49, Part I, Geology and Geophysics. pp. 213-216. (Year: 2006).*

(Continued)

Primary Examiner — Tima M. McGuthry-Banks
(74) Attorney, Agent, or Firm — Michael Best & Friedrich LLP

(57) ABSTRACT

A process for recovery of metal comprising copper and/or a precious metal from a metal containing material, including the steps of: leaching the metal containing material with an (Continued)

alkaline lixiviant and an amino acid or derivative thereof in order to produce a metal containing leachate; and extracting the metal from the leachate.

15 Claims, 16 Drawing Sheets

(51) Int. Cl.
    *C22B 3/16*     (2006.01)
    *C22B 15/00*     (2006.01)

(52) U.S. Cl.
    CPC ............ *C22B 11/04* (2013.01); *C22B 15/008* (2013.01); *Y02P 10/236* (2015.11)

(56) References Cited

U.S. PATENT DOCUMENTS

| | | | |
|---|---|---|---|
| 4,070,182 A * | 1/1978 | Genik-Sas-Berezowsky | ............. C22B 11/04 423/32 |
| 4,801,329 A * | 1/1989 | Clough | ..................... C22B 5/04 423/22 |
| 4,895,597 A | 1/1990 | Lin et al. | |
| 6,767,522 B1 * | 7/2004 | Rojas-Chapana | ......... C12P 3/00 423/150.1 |
| 9,150,942 B2 * | 10/2015 | Xia | ........................... C22B 3/04 |
| 2014/0212346 A1 * | 7/2014 | Xia | ......................... C22B 11/04 423/1 |

FOREIGN PATENT DOCUMENTS

| | | |
|---|---|---|
| WO | 2004005556 | 1/2004 |
| WO | 2010/121317 A1 | 10/2010 |
| WO | 2013023297 | 2/2013 |
| WO | WO-2013023297 A1 * | 2/2013 ............. C22B 11/04 |

OTHER PUBLICATIONS

Michel, Didier et al. "Integration of Amino Acids in the Thiosulfate Gold Leaching Process." Randal Gold and Silver Forum. pp. 99-103. (Year: 1999).*
Xia, Chen. Derwent ACC-No. 2013-C56547. WO 2004/00556 patent family. (Year: 2013).*
Groudev, S. N. et al. "Extraction of Gold and Silver from Oxide Ores by Means of a Combined Biological and Chemical Leaching." 12 pages. Conference paper. (Year: 1993).*
Dinardo, O. et al. "Treatment of Thiosalts in Milling Effluents: A Review of Treatment Processes." Thiosalts Consortium—Phase II. Job No. 51612. Mining and Mineral Sciences Laboratories Report MMSL 97-060 (CR). January. 118 pages. (Year: 1998).*
Bas, A. D. et al. "Treatment of a Copper-Rich Gold Ore by Ammonia Assisted Cyanide Leaching." XXVI International Mineral Processing Congress (IMPC) 2012 Proceedings. Sep. 24-28. pp. 00356-00365. (Year: 2012).*
Clough, Thomas J. et al. "Metal Value Recovery form Carbonaceous Ores." U.S. Pat. No. 4,801,329. Patent text. (Year: 1989).*
Espacenet Family list for US 2014212346 A1 including WO 2013023297 A1 published Feb. 21, 2013. (Year: 2014).*
International Search Report and Written Opinion for Application No. PCT/AU2014/000877 dated Nov. 18, 2014 (13 pages).
Feng, D. et al., "The role of amino acid in the thiosulphate leaching of gold," Minerals Engineering, Apr. 12, 2011, vol. 24, No. 9, pp. 1022-1024.
Aksu, S. et al., "Electrochemistry of Copper in Aqueous Glycine Solutions," Journal of The Electrochemical Society, 148 (1) B51-B57 (2001).
Scaife, J.F. "The Combination of Copper with Amino Acids, Peptides, and Proteins," Can. J. Biochem. Physiol. vol. 37 (1959), pp. 1033-1048.
Liu, J. et al., "Experimental Studies on Leaching of Copper and Gold by Amino Acids," Chinese Science Bulletin, vol. 39, No. 18, Sep. 1994, 1541-1544.
European Extended Search Report for Application No. 14842873.3 dated Jul. 11, 2017 (12 pages).

* cited by examiner

PROCESS FOR COPPER AND/OR PRECIOUS METAL RECOVERY

TECHNICAL FIELD

A process is disclosed for the recovery of a metal selected from copper and precious metals from copper and/or precious metal containing materials. The process may be used to recover metals from ores, ore concentrates or tailings, or from other metal containing materials including jewelry, electronic scrap and other scrap materials. The process may be particularly used in the context of leaching low grade ores, ore concentrates or tailings in an in-situ or heap leach approach.

As used herein, the term "precious metal" means gold, silver and the platinum group metals: ruthenium, rhodium, palladium, osmium, iridium, and platinum. However, of these precious metals, the process is particularly applicable to the recovery of gold and/or silver, and discussion will therefore focus on these two precious metals.

BACKGROUND ART

The recovery of copper and/or precious metals is routinely conducted by hydrometallurgical processes. Different types of reagents have been used to leach copper and/or precious metals. Many of those reagents have disadvantageous properties, such as toxicity, expense, lack of selectivity and low extraction rates, as is discussed in detail below.

Precious Metals

In the leaching of precious metals such as gold and/or silver, lixiviants include cyanide, thiosulfate, thiocyanate, halides and halogens (such as chlorides, bromides and iodides and chlorine, bromine and iodine) and thiourea. Of these, cyanide remains the predominant reagent that is applied on an industrial scale for gold and gold-silver ores, although copper ammoniacal thiosulphate systems have been implemented at some gold mining and processing sites at an industrial scale as of 2012. Halides (chlorine and chlorides in particular) are often used in the final refining of impure bullion and doré (gold-silver alloy). In addition, highly poisonous and environmentally hazardous metallic mercury is often still used by many artisanal miners. Despite being a robust leaching reagent (lixiviant), sodium cyanide, and cyanides of other alkali (such as potassium) metals and alkali earth metals (such as calcium), all referred to as "Cyanide", use poses a number of challenges, principally due to its toxicity, regulatory restrictions, high carbon footprint and low selectivity in low grade ores. It is particularly problematic for gold ores with high copper and/or high silver content as copper is often present at levels of around 1000 times the gold concentration (silver often 5-50 times gold concentration), leading to excessive cyanide consumption, and removal of available cyanide for gold leaching. Cyanide is also an expensive reagent so that using it for lower value metals such as copper (and less so, for silver) quickly becomes uneconomic, not only for leaching, but also due to downstream impacts (eg, competition with gold during adsorption onto activated carbon, elution and waste treatment). In addition it generates weak acid dissociable (WAD) cyanides which require cyanide detoxification/destruction or recovery processes.

The current alternative lixiviants to cyanide also pose many challenges. Despite sodium thiosulphate being the main contender as a lixiviant for gold, it is expensive, it requires additional copper (as $Cu^{2+}$) as an oxidant (if not already present in the gold ore) and volatile and noxious ammonia to stabilise the leaching system. It is applicable to only a limited number of gold ores. Further, it cannot economically be produced at site, it requires complex downstream separation and it is not biodegradable.

The key challenges of alternative inorganic lixiviants are set out below:

| Lixiviant | Detractors |
| --- | --- |
| Sodium thiocyanate in acid media | Poor solubility of silver often associated with gold.<br>Corrosion due to acid environment<br>Toxicity<br>Very stable (poorly biodegradable)<br>Cannot be produced on site |
| Thiourea | Carcinogen and toxic.<br>Expensive<br>Dangerous to the environment<br>Cannot be produced on site. |
| Halides (chloride-bromide-iodide) | Limited to gold in flotation concentrate rather than low grade ore.<br>Corrosion and high capital costs<br>Poor selectivity (mobilisation of most metals).<br>Poor solubility of other precious metals such as silver.<br>Not biodegradable.<br>Damaging to the environment. |

Copper

Currently, more than 20% of world copper production is produced by using hydrometallurgical processes, particularly by acidic heap leach (or heap bioleach)-solvent extraction-electrowinning processes for low grade ores.

The presence of copper minerals with gold is known to lead to many challenges during the cyanidation of gold ores, such as high consumption of cyanide with low gold extraction and undesirable impacts on gold recovery during the downstream processes. One previous process for the treatment of such ores has focussed on selective leaching of gold from copper-gold ores with ammonia-cyanide. However, the success of this process is sensitive to the type of ore. While this process can be effective for treating oxidised ores, it was found that the treatment of transition or sulphidic ores gave poor gold recovery and required high reagent concentrations. Copper minerals consume about 30 kg/t NaCN for every 1% of reactive copper present, making conventional cyanidation of copper-gold ores or concentrates uneconomic. Moreover, both cyanide and ammonia have detrimental environmental effects.

Of the copper sulphide minerals, chalcopyrite is the most refractory to leaching in acidic media (sulphuric acid, on its own or in conjunction with hydrochloric or nitric acids, or associated with bioleaching) which is the conventional hydrometallurgical process to extract copper, and poor copper recovery is the norm with elevated temperatures being required for acceptable copper extraction. Various passivation layers have been noted to form depending on the leach conditions, which slows the leach reaction significantly, or stops the reaction from proceeding, depending on the surface nature of chalcopyrite and the particular chemical leach conditions used. In gold-copper ores, slow leaching chalcopyrite contributes to cyanide consumption and, in some cases, occlusion of gold.

There are a number of large copper-gold mines in Australia and the Asia-Pacific region. These plants produce copper-gold concentrates and ship them for copper smelting and gold recovery from anode slimes (e.g. Telfer, Mt Carlton, Boddington and Cadia Valley, etc.). However, the increase of gold bearing-pyrite and gold bearing-arsenian pyrite content in the copper ores results in the production of low grade copper concentrate. In addition, the presence of arsenic limits of the flotation mass pull of chalcopyrite rich concentrates, so that a significant portion of the gold has to be recovered by gravity and leaching of the flotation tails. The transportation of the low grade concentrate overseas is often uneconomical. Therefore, an alternative process would be useful for recovering copper and/or gold from such a low-grade or difficult ores.

There is accordingly a need for an alternative metal recovery process that uses cheap and environmentally benign lixiviants for precious metal and/or copper recovery. There is also a need for an environmentally friendly recovery process with low (operating and capital) cost as an alternative extraction method for copper and/or precious metals. There is also a need for an environmentally friendly recovery process can be used to leach copper and/or gold and/or silver through in-situ leaching, in place leaching, heap leaching or vat leaching of either ore or mineral concentrates. There is a further need for an efficient and environmentally friendly process for selectively recovering copper from copper/precious metal ores and ore concentrates.

SUMMARY OF THE DISCLOSURE

According to the present disclosure, there is provided a process for recovery of metal comprising copper and/or a precious metal from a metal containing material, including the steps of:
  leaching the metal containing material with an alkaline lixiviant and an amino acid or derivative thereof in order to produce a metal containing leachate; and
  extracting the metal from the leachate.

The process may comprise leaching of copper from a copper containing material.

Alternatively, the process may comprise leaching of copper from a copper and precious metal containing material.

Alternatively, the process may comprise leaching of copper and a precious metal from a copper and precious metal containing material.

Alternatively, the process may comprise leaching of precious metal from a copper and precious metal containing material.

Alternatively, the process may comprise leaching of precious metal from a precious metal containing material.

The present disclosure also provides an alkaline leaching solution for use in the above process comprising an amino acid and/or derivative thereof, and having a pH of at least 9. In an embodiment, the pH is at least 10.

The alkaline species in the lixiviant may comprise one or more of slaked lime (calcium hydroxide), caustic soda (sodium hydroxide), caustic potash (potassium hydroxide), soda ash (sodium carbonate) or ammonia/ammonium hydroxide.

The alkaline lixiviant may contain an oxidant. The presence of an oxidant has been found to be particularly advantageous when the process is used for the recovery of a precious metal. The oxidant may be an oxidising gas, such as oxygen or air, or a peroxide, such as hydrogen peroxide and/or calcium peroxide, or other oxidants such as manganese dioxide.

In an embodiment, the metal containing material comprises ores, concentrates or tailings. The ore or concentrate may be one or more of oxidised, sulfidic or carbonaceous gold ore. The ore may be high or low grade.

In an embodiment, the process is used to recover metals from a low grade ore or ore concentrate.

While the following discussion will focus on the use of the process for recovering metals from ores, concentrates or tailings, it is to be understood that the process is not limited to such use and can be used to recover metals from other sources such as recycled materials, powders, electronic scrap, jewelry, scrap etc.

As previously noted, the main lixiviants in the leach solution are environmentally friendly reagents, such as amino acids optionally together with an oxidant such as hydrogen peroxide.

The lixiviant includes one or more amino acids or derivatives thereof. The amino acid may comprise an alpha amino acid. The amino acid may comprise one or more of Glycine, Histidine, Valine, Alanine, Phenylalanine, Cysteine, Aspartic Acid, Glutamic Acid, Lysine Methionine, Serine, Threonine, and Tyrosine.

In one embodiment, the amino acid is glycine. Glycine is a simple amino acid that is easy and cheap to produce on an industrial scale. Glycine has a number of advantages over many other lixiviants: it is an environmentally safe and stable reagent, yet it is enzymatically destructible and is easily metabolised in most living organisms. Due to its complexing action, glycine can also enhance the respective solubilities of precious metals and copper in aqueous solutions Glycine is presently produced at similar levels, at a price comparable to, or cheaper than, sodium cyanide. Without wishing to be limited to theory, it is believed that Glycine forms a strong complex with gold(I) as $Au(H_2NCH_2COO)_2^-$ and with copper(I) as $Cu(H_2NCH_2COO)_2^-$. The stability constant of gold with glycine at pH 9 is 18.0 and of copper with glycine at pH 9 is 18.9.

The amino acid derivative may comprise a peptide, such as a di- or tri-peptide.

In another embodiment, the leachant comprises a combination of two or more amino acids. The combination of amino acids may comprise glycine and one or more other amino acids. For example, the combination may comprise glycine and histidine.

The amino acid may be produced via bacteria or though abiotic processes. It may be sourced through normal commercial channels or produced on site. If produced on site, the amino acid may be produced either singly or in combination at the ore processing site from an appropriate nutrient medium by a range of microorganisms and bacteria, such as (but not limited to):
  *Achromobacter paradoxus*
  *Aeromonas hydrophila*
  *Aeromonas* sp.
  *Bacillus circulans*
  *Bacillus megaterium*
  *Bacillus mesentericus*
  *Bacillus polymyxa*
  *Bacillus subtillis*
  *Bacillus* sp.
  *Candida* sp.
  *Chromobacterium flavum*
  *Penicillium* sp.
  *Pseudomonas aerginosa*
  *Pseudomonas liquefaciens*
  *Pseudomonas putida*
  *Pseudomonas* sp.
  *Sarcina flava*

The concentration of amino acid in the leaching solution may be at least 0.01 M, such as a minimum of 0.1 M. In an embodiment, the concentration is a maximum of 2 M. The concentration will depend on the particular leaching environment. For example, in a heap leach application, the concentration may be a minimum of 0.01M. In a heap leach application, the maximum may be 0.1 M. In another embodiment, such as in a tank leaching application, the concentration may be a maximum of 1 M. In another embodiment of the process, the concentration of amino acid may be from 0.5 to 1M.

It has been found that the leaching of metals using amino acids may be enhanced in the presence of an oxidant in an alkaline medium. It has been found that an oxidant can slightly increase copper dissolution but it has a more pronounced effect on precious metal dissolution.

In an embodiment, the oxidant is oxygen-containing, such as hydrogen peroxide or an oxygen containing gas. Other oxidants that may be considered are manganese dioxide, potassium permanganate, or calcium peroxide. However, other oxidants (other than pure oxygen or hydrogen peroxide) can be environmentally hazardous and can introduce new undesirable metallic species.

Hydrogen peroxide has been found to be particularly effective due to its low cost and environmentally benign properties (it decomposes to water). Its solubility is also relatively stable up to the elevated temperatures of the process, as compared with an oxygen containing gas (such as $O_2$ or air). The amount of peroxide in solution may be at least 0.005 wt %, such as 0.5 wt % or greater. Again, the amount of peroxide used will depend on the leaching environment: e.g., a minimum of 1 wt % hydrogen peroxide may be suitable for tank leach, and a minimum of 0.1 wt % for heap leach operations. The amount will also depend on the metal being leached. As mentioned, the presence of an oxidant such as $H_2O_2$ may slightly increase the solubility of copper. However, an oxidant has a greater effect of the solubility of precious metal and generally, the higher the concentration of peroxide, the greater is the amount of precious metal dissolution. A suitable upper limit of peroxide may be 5 wt %. In an embodiment, the maximum peroxide concentration is 1%. Solutions will typically be made up from 30 wt % aqueous industrial solution which is readily available.

The pH of leach solution or slurry is alkaline. It may have a pH within a wide range between pH 6 to 13. Alkalis such as sodium hydroxide or slaked lime may be used to adjust the leaching solution's pH if required. In an embodiment, the pH is above 10. In another embodiment, the pH is 11 or higher.

The process of the disclosure may be conducted over a wide range of conditions, such as pH and Eh. This makes the process robust for heap or in-situ leaching and even for tank leaching.

The leachant may further include a leaching catalyst. In the case of leaching precious metals, the catalyst may comprise cupric (copper(II)) species. The cupric species enhance/accelerate the leaching of precious metals with amino acids. The cupric species may already be present as copper minerals in the ore. For precious metal ores that do not already contain copper, cupric species may be added to enhance leach rates.

Copper (II) may be used (or be present) in concentrations of 1 mM or higher. The cupric concentration may be up to 10 mM. In an embodiment, the cupric concentration is up to 5 mM. The cupric species perform the role of a catalyst, as opposed to an oxidant, as in thiosulphate leaching processes. Accordingly, cupric species are not consumed in the present process.

The process may be carried out at ambient temperature or at a temperature above ambient temperature. The process may be effectively conducted at ambient temperature when used to recover copper. The process may be conducted at an elevated temperature when used to recover precious metals. An elevated temperature has been found to be particularly advantageous when the process is used for the recovery of a precious metal.

Where the temperature is elevated, the temperature may be a minimum of 30° C., such as at least 40° C. The maximum temperature may be the boiling point of the solution. In an embodiment the process may be conducted at a temperature up to 75° C. It has been found that good leaching results are obtained at a temperature up to 60° C. The leach solution may be heated to the desired temperature using a combination of, or either of, conventional process heat exchange and solar heating of the process liquors.

Where the process is used to recover both copper and precious metals from a material containing them, a multi-stage (e.g. 2-stage) differential leaching process may be used that exploits differences in the respective recovery conditions for both metal types. The differences in respective recovery conditions may comprise different temperatures and/or the presence of an oxidant. In one embodiment of such a differential leaching process, copper can be leached at ambient temperature and the precious metals can then be leached at elevated temperature. In another embodiment, copper can be leached in the absence of hydrogen peroxide addition, then the precious metals can be leached after addition of hydrogen peroxide.

In the case where precious metals are not present, and differential dissolution is not important, elevated temperatures may enhance copper leach rates from ores or concentrates.

The process may include constructing a heap comprising the ore and/or concentrate, then applying the leachant to the heap. The leachant may be applied to a heap by drip, subsurface injection, or spray irrigation.

Alternatively, the leachant may be injected into pre-blasted rock under pressure for in-situ or in-place leaching, or in vats, or in agitated tanks. As used herein, "in-situ" leaching refers to leaching using the natural porosity of the rock. For "in-place" leaching, the porosity is enhanced through controlled blasting, or fluid cracking or other means.

The metal is subsequently extracted from the leachate. Extraction results in a purified and concentrated form of the metal/s. Extraction may be by way of adsorption such as by carbon-in-pulp (CIP), carbon-in-leach (CIL), carbon in column (CIC), cementation (eg, onto zinc dust), or by ion exchange (Resin-in-leach (RIL), Resin-in-pulp (RIP) and Resin-in-Column (RIC)). Alternatively, the metal may be extracted by solvent extraction.

In the case of extracting precious metals, the precious metal complexes adsorb well onto granular activated carbon. Leach adsorption combinations such as carbon-in-pulp and carbon-in-leach may be applied to single or mixed amino acid systems. In the case of using the adsorption process, a suitable gold elution process may be adopted to achieve high elution efficiency. Carbon based adsorption systems fall within the experience range of nearly all cyanide based gold mining and processing operations, thereby making the present process compatible with existing gold extraction techniques.

The inventors have found that the amino acid-precious metal complex successfully loads on to activated carbon from leachates with or without the leach catalyst. In the case of copper recovery from solution, this can occur via solvent extraction or ion exchange, followed by electrowinning, Accordingly, in a first aspect, there is provided a process for recovery of precious metal from a precious metal containing material, including the steps of:
- leaching the precious metal containing material with an alkaline lixiviant containing an oxidant and an amino acid or derivative thereof at an elevated temperature in order to produce a precious metal containing leachate; and
- extracting the precious metal from the leachate.

In an embodiment of the first aspect of the process, the recovery of precious metals includes the following steps:
- the amino acid is dissolved into an aqueous solution and added to an aqueous leach solution or slurry;
- relevant amounts of an oxidant or oxidants (such as peroxide) is/are added to the leach solution;
- the leach pH is adjusted in the range between pH 6 to pH 13, preferably at least pH 11;
- the leach solution is heated up in the range of 30° C. to 100° C., preferably 40° C. to 60° C.;
- the leach time may be in the range of 5 days to 30 days or more;

At the end of the leach period, a leach slurry or leachate is filtered and the solid residue may be washed under filtration several times to remove any dissolved metal ions from tails. The leachate is treated with activated carbon to extract the precious metals.

In an embodiment of the first aspect, a low cost and environmentally friendly hydrometallurgical process is disclosed for directly leaching precious metals from low-grade ores and/or waste rock stockpiles, thereby lowering economic cut-off grades to increase the proportion of resource that can be classified as reserve.

Potential advantages of the first aspect of the disclosed process are the reduction or elimination of one or more of the following: (1) milling cost, (2) pre-concentration cost, (3) use of complex agitation leach tanks (in the case of heap leaching and in situ leaching), (4) overall energy consumption (from mine to metal in the case of heap leaching and in situ leaching), (5) use of toxic and dangerous reagents, (6) environmental impact of toxic heavy metals mobilised as weak acid dissociable (WAD) cyanides, and (7) carbon footprint, (8) processing complexity (compared to alternative lixiviants) and (9) chemical complexity (thereby reducing unwanted by-products and chemical intermediates). Other advantages include (10) low reagent cost, (11) potential for at-site production (for mixed amino acids by micro-organisms), (12) large bulk availability for simple amino acids, e.g. glycine, (13) legal accessibility (not regulated chemicals), (14) ability to perform targeted biological destruction, or (15) to recycle and reuse reagents, (16) potential to use for a variety of precious metals, (17) high solubility of amino acids and their metal complexes in water, allowing the intensification of the process to smaller equipment sizes.

In a second aspect, there is provided a process for recovery of copper from a copper containing material, including the steps of:
- leaching the copper containing material with an alkaline lixiviant containing an amino acid or derivative thereof in order to produce a copper containing leachate; and
- extracting the copper from the leachate.

An embodiment of the second aspect may be used to conduct selective copper leaching from a copper-precious metal ore or ore concentrate. It may be used to selectively leach copper from a copper-gold ore concentrate, followed by gold leaching (after optional washing of the residue) either using the first aspect of the process at elevated temperature (40-60° C.), or by using another gold recovery process (eg, cyanidation). Copper selective leaching will reduce the gold losses due to a cementation mechanism of gold in the presence of metallic copper as all of the metallic copper will dissolve in the pre-leaching stage.

An advantage of the second aspect is that it can address a persisting challenge in the copper and copper-gold processing, i.e. finding an appropriate lixiviant with lower environmental and safety risks for heap, dump, in-situ and vat leaching operations, which are slow leaching operations open to the surrounding environment. Alternatively, it may also be implemented in a counter-current decantation (CCD) circuit, allowing for sufficient residence time.

Potential advantages of the second aspect include:
1. Copper can be selectively leached over gold in glycine-peroxide solution. In one embodiment, about 98% of copper present in a gold-copper concentrate was leached in 48 hours in two stages.
2. 100% of chalcocite, cuprite, metallic copper, and about 80% of chalcopyrite can be dissolved in a glycine-peroxide lixiviant at ambient temperature.
3. Gangue element dissolution, in particular that of iron (eg derived from pyrite), is minimal compared to conventional sulphuric acid based leaching.
4. While copper extraction typically increases by increasing the concentrations of amino acid and oxidant (e.g., peroxide, oxygen or air), it was found that amino acid can effectively leach some copper minerals in the absence of deliberate addition of an oxidant
5. Given that the leaching process is conducted under an alkaline leaching condition, the final residue can be directly leached by the cyanidation process, if required or preferred.
6. The cyanide-soluble fraction of the copper minerals has been significantly reduced, thereby having a large impact on downstream cyanide consumption during the subsequent leaching of gold. The alkaline leaching of the copper minerals also implies that no swing in pH (as for a conventional acid leach) is required that would increase caustic requirements downstream.
7. The alkaline amino acid system is particularly suitable for copper deposits with significant proportion of acid consuming minerals such as calcite, trona, dolomite or other carbonate-based minerals, which often precludes the conventional acidic extraction processes.

Further advantages of the second aspect are similar to those of the first aspect, namely, reduction or elimination of one or more of the following: (1) milling cost, (2) pre-concentration cost, (3) use of complex agitation leach tanks (in the case of heap leaching and in situ leaching), (4) overall energy consumption (from mine to metal in the case of heap leaching and in situ leaching), (5) use of toxic and dangerous reagents, (6) environmental impact of toxic heavy metals mobilised as weak acid dissociable (WAD) cyanides, and (7) carbon footprint, (8) processing complexity (compared to alternative lixiviants) and (9) chemical complexity (thereby reducing unwanted by-products and chemical intermediates). Other advantages include (10) low reagent cost, (11) potential for at-site production (for mixed amino acids by micro-organisms), (12) large bulk availability for simple amino acids, e.g. glycine, (13) legal accessibility (not regulated chemicals), (14) ability to perform targeted biological destruction, or (15) to recycle and reuse reagents, (16) high solubility of amino acids and their metal complexes in water, allowing the intensification of the process to smaller equipment sizes.

In a third aspect, there is provided a differential leaching process for recovery of copper and precious metal from a copper and precious metal containing material, including the steps of:

leaching the copper and precious metal containing material with an alkaline lixiviant containing an amino acid or derivative thereof under first conditions in order to produce a copper containing leachate and precious metal containing residue;

leaching the precious metal containing residue with an alkaline lixiviant containing an amino acid or derivative thereof under second conditions in order to produce a precious metal containing leachate;

extracting the copper from the copper containing leachate; and extracting the precious metal from the precious metal containing leachate.

The first and second conditions may involve differences in respective recovery conditions. Those differences may comprise different temperatures and/or the presence or absence of an oxidant. In one embodiment of such a differential leaching process, copper can be leached at ambient temperature and the precious metals can then be leached at elevated temperature. In another embodiment, copper can be leached in the absence of hydrogen peroxide addition (but with aeration), then the precious metals can be leached after addition of hydrogen peroxide.

BRIEF DESCRIPTION OF THE DRAWINGS

Notwithstanding any other forms which may fall within the scope of the apparatus and method as set forth in the Summary, specific embodiments will now be described, by way of example only, with reference to the accompanying drawings in which.

EXAMPLES

Non-limiting Examples of a process for recovery of copper or precious metal from a copper and/or precious metal containing material will now be described.

Examples 1 to 15

Recovery of Precious Metal

All of Examples 1 to 15 were carried out using solutions prepared from either analytical grade or synthesized reagents and Millipore water. Unless specified, all Examples were conducted using magnetic stirrers and Teflon coated magnetic stirrer bars. The gold and/or silver was added to a solution of amino acid and peroxide in a beaker and heated to the required temperature while stirring. Gold and gold-silver sheets used in all the examples were made from 99.99% pure gold and silver. Before each experiment, the surface of the each sheet was polished with Struers water-proof silicon carbide paper (FEPA P#2400). Finally the gold sheet was washed with distilled water and allowed to dry.

For testing the carbon activity to adsorb gold-glycine complex, unless specified, 1.5 g/L of fresh carbon (−2.36+2 mm) was added into the pregnant solutions after leaching. The adsorption experiments have been conducted at room temperature at rotation speed of 150 rpm. In order to evaluate the gold adsorption on carbon, sub-samples were taken at different time intervals and then diluted with aqueous sodium cyanide before being analysed using ICP-OES.

Example 1

Figure 1:
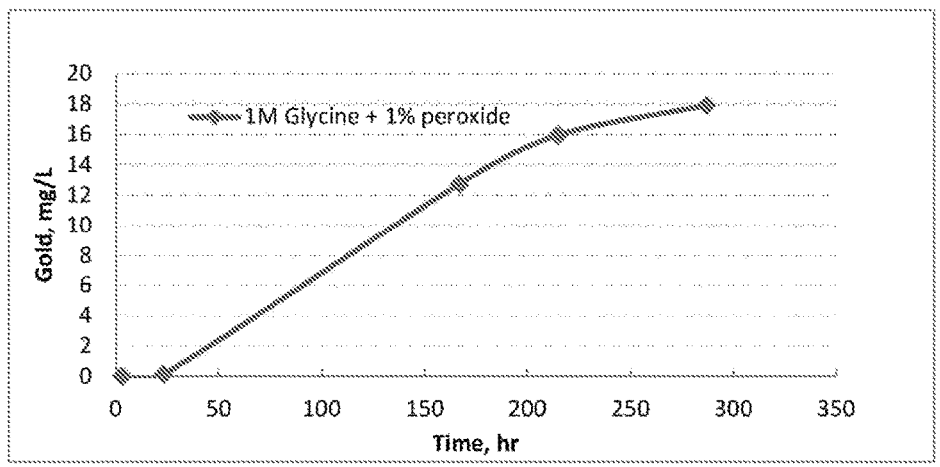
FIG. 1 is a graph showing the gold concentrations in leach solution at different leaching time (pH 10, Temperature 60° C., 1% peroxide and 1M Glycine).

In Example 1, a solution containing 1M of the amino acid: glycine, and 1% of the oxidant, hydrogen peroxide, was used to dissolve pure metallic gold (as gold wire and gold foils) at a temperature of 60° C. FIG. 1 shows the amount of gold dissolved in solution (400 mL) containing 1M of glycine and 1% of peroxide over leaching time. It can be seen that gold dissolves under these conditions in reasonable amounts of up to 18 mg/L in 280 hours. In this example, lower reagents concentrations (0.1-0.4 M glycine), lower temperature (i.e. 40° C.) and natural pH of the solution (about pH 6) were also shown to be effective.

Example 2

Effect of Glycine Concentration

Figure 2:
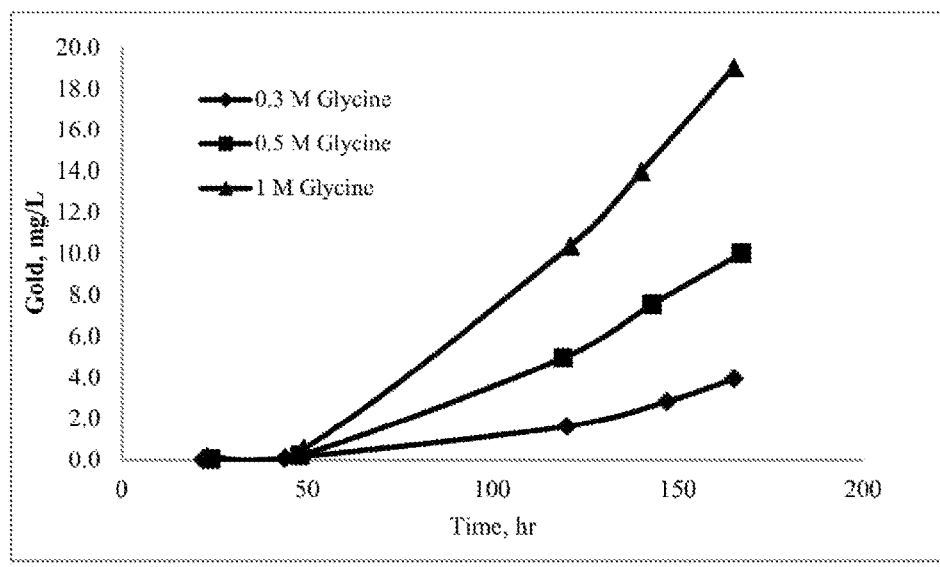
FIG. 2 is a graph showing gold dissolution in solutions containing different glycine concentrations and 1% hydrogen peroxide at pH 10 and temperature of 60° C.

The kinetics of gold dissolution in solutions containing different glycine concentrations and 1% hydrogen peroxide at pH 10 and temperature of 60° C. was studied and the results are plotted in FIG. 2. It can be seen from the results shown in FIG. 2 that, under the conditions of this Example, gold dissolution increases by increasing the glycine concentration up to 1 M. Table 1 shows the gold leach rate at different glycine concentrations.

TABLE 1

Gold leach rate at different glycine concentrations: Glycine, 1% $H_2O_2$, pH 10, 60° C.

| Glycine, M | Au, $10^3 \times \mu mol/m^2 \cdot s$ |
|---|---|
| 0.30 | 11.3 |
| 0.50 | 16.9 |
| 1.00 | 31.3 |

The gold leaching rate in glycine-peroxide system as shown in Table 1 can be significantly higher than the rates using thiosulfate-ferric oxalate and ferric EDTA systems in the absence of thiourea.

Example 3

Gold-Glycinate Complex Adsorption on Carbon

One of the considerations for an alternative to cyanide-based leaching of gold is the strength of adsorption of the leached gold on activated carbon. Therefore, it is appropriate to examine the ability of activated carbon to adsorb gold-glycine complex from the leach solution particularly from an industrial application perspective.

Following some of the kinetic leach experiments, different amounts of fresh carbon were added into the pregnant leach solutions. Sub-samples from different adsorption tests were taken at different intervals and analysed by ICP-OES. The kinetics of gold and silver adsorption onto activated carbon have been evaluated by the determination of the carbon activity constant using Equation (1):

$$\log(\text{delta}[\text{Au or Ag}]c/[\text{Au or Ag}]s) = n \log t + \log k \qquad (1)$$

delta [Au or Ag]c=change in [Au or Ag] on carbon from t=0 to t=t hours; [Au or Ag]s=[Au or Ag] in solution at t=t hours; n=an experimentally derived constant for the slope of the above equation; and k=an empirical rate constant at t=1 hour;

The adsorbed gold and silver on carbon and the amounts of metals in solutions have been calculated and presented in Tables 2, 3, and 4.

Figure 3:
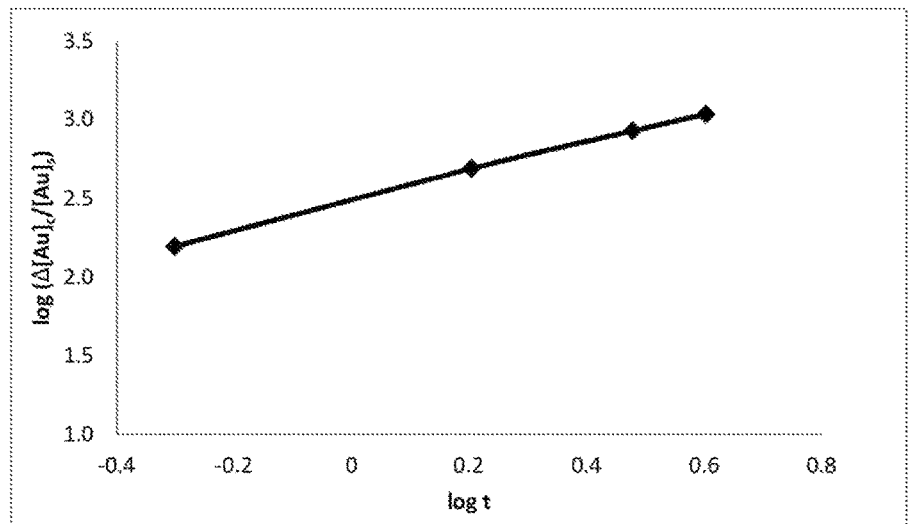
FIG. 3 is a Plot of Log ($\Delta$[Au]c/[Au]s) against Log t for pregnant solution after leaching for 15 days (Loading time 4 hours, Carbon 1.466 g/L).

FIG. 3 also shows the plot of Log ($\Delta[\text{Au}]c/[\text{Au}]s$) against (Log t) for the data shown in Table 3. The adsorption experiments showed that the gold-glycine complex using the process of the disclosure is adsorbed onto the activated carbon in a rate similar or even higher than gold-cyanide complex.

It can also be seen from the data shown in Tables 3 and 4 that the silver-glycinate complex is less well adsorbed on the activated carbon and the presence of silver enhances gold loading on carbon.

TABLE 2

Adsorption of gold on activated carbon from pregnant solution after leaching for 456 hours (Solution volume 350 mL).

| Time (min) | Time (hr) | [Au] (mg/L) | Δ[Au]s | Δ[Au]c | [Au]c/[Au]s | Log t | log(Δ[Au]c/[Au]s) |
|---|---|---|---|---|---|---|---|
| 0 | 0.00 | 15.5 | | | | | |
| 30 | 0.50 | 11.6 | 3.882 | 2649 | 229 | −0.301 | 2.359 |

TABLE 2-continued

Adsorption of gold on activated carbon from pregnant solution after leaching for 456 hours (Solution volume 350 mL).

| Time (min) | Time (hr) | [Au] (mg/L) | Δ[Au]s | Δ[Au]c | [Au]c/[Au]s | Log t | log(Δ[Au]c/[Au]s) |
|---|---|---|---|---|---|---|---|
| 60 | 1.00 | 9.96 | 5.504 | 3701 | 372 | 0.000 | 2.570 |
| 120 | 2.00 | 8.14 | 7.321 | 4852 | 596 | 0.301 | 2.775 |
| 240 | 4.00 | 6.47 | 8.993 | 5872 | 908 | 0.602 | 2.958 |

TABLE 3

Adsorption of gold on activated carbon from pregnant solution after leaching a gold/silver alloy for 168 hours (Solution volume 380 mL).

| Time (min) | Time (hrs) | [Au] mg/L | Δ[Au]s | Δ[Au]c | [Au]c/[Au]s | log t | Log(Δ[Au]c/[Au]s) |
|---|---|---|---|---|---|---|---|
| 0 | 0.00 | 38.70 | | | | | |
| 30 | 0.50 | 24.60 | 14.097 | 6565 | 267 | −0.301 | 2.426 |
| 96 | 1.60 | 15.82 | 22.882 | 10656 | 674 | 0.204 | 2.828 |
| 180 | 3.00 | 12.08 | 26.616 | 12395 | 1026 | 0.477 | 3.011 |
| 240 | 4.00 | 10.26 | 28.435 | 13242 | 1290 | 0.602 | 3.111 |

TABLE 4

Adsorption of silver on activated carbon from pregnant solution after leaching a gold/silver alloy for 168 hours (Solution volume 380 mL).

| Time (min) | Time (hrs) | [Ag] mg/L | Δ[Ag]s | Δ[Ag]c | [Ag]c/[Au]s | Log t | log(Δ[Ag]c/[Au]s) |
|---|---|---|---|---|---|---|---|
| 0 | 0.00 | 56.1 | | | | | |
| 30 | 0.50 | 48.1 | 8.079 | 3683 | 77 | −0.301 | 1.884 |
| 96 | 1.60 | 42.7 | 13.412 | 6114 | 143 | 0.204 | 2.156 |
| 180 | 3.00 | 39.1 | 17.028 | 7763 | 198 | 0.477 | 2.298 |
| 240 | 4.00 | 37.0 | 19.108 | 8711 | 235 | 0.602 | 2.371 |

Example 4

Effect of Amino Acids Type

Figure 4:
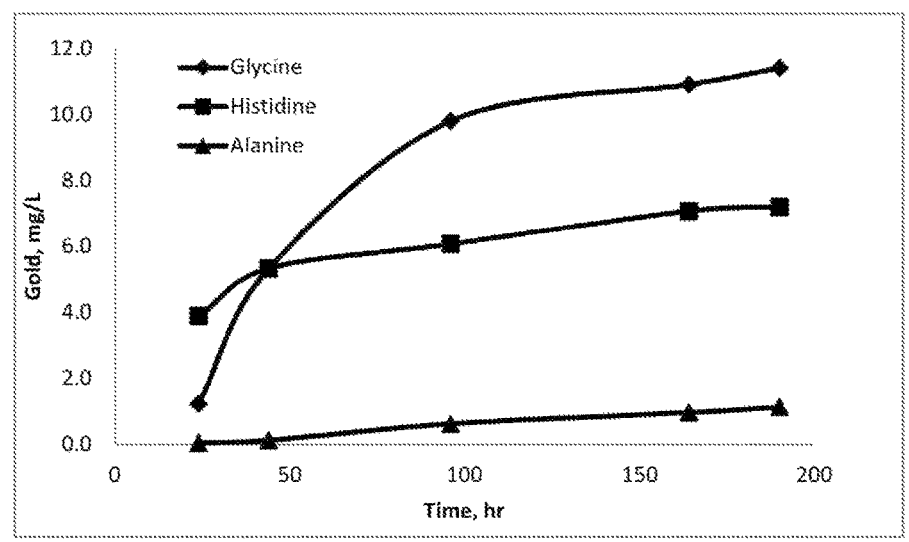
FIG. 4 is a graph showing the effect of amino acids type on gold dissolution: 0.05M amino acid, 1% $H_2O_2$, pH 11, at 60° C.

Glycine, histidine and alanine amino acids have been used to test the effect of amino acid type on gold dissolutions. The experiments have been conducted at 0.05 M of amino acids at pH 11 and 60° C. temperature. FIG. 4 shows the gold dissolution in different amino acids system. It can be seen that the initial gold dissolution in histidine solution is faster than glycine and alanine solutions, however, by extending the leaching, it was found glycine dissolves gold faster and to a greater extent than histidine and alanine.

Figure 5:
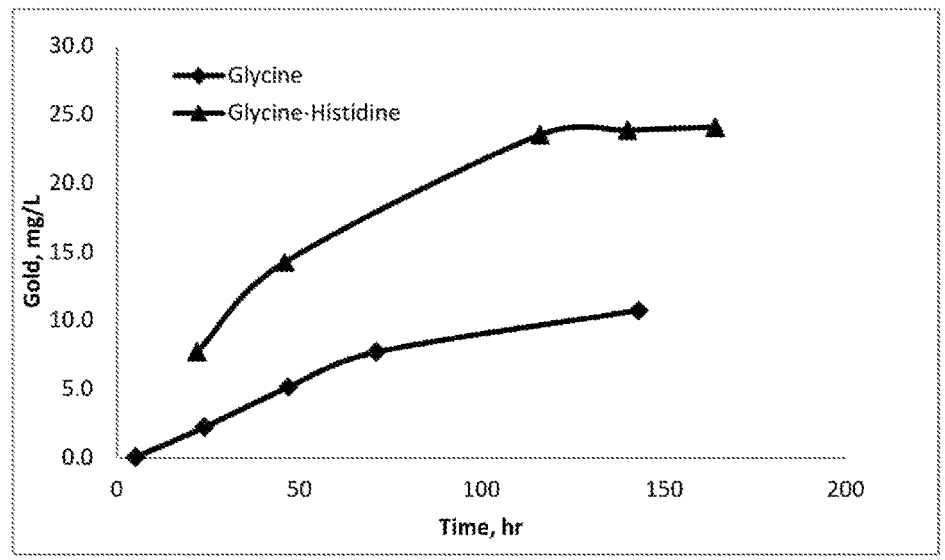
FIG. 5 is a graph showing the effect of amino acids mix on gold dissolution: 0.1M amino acid, 1% $H_2O_2$, pH 11, at 60° C.

To evaluate the effect of amino acid mixtures, a mixture of 0.05 M Glycine and 0.05 M histidine, 1% $H_2O_2$, at pH 11.5 and 60° C. was assessed. FIG. 5 shows the effects of using a combination of glycine-histidine solutions and glycine only on gold dissolution. It is clear that using a mix of glycine and histidine dissolves gold higher than using glycine only.

The Kinetics of gold adsorption onto activated carbon from glycine-histidine solutions has been evaluated by the determination of the carbon activity constant using Equation (2). The adsorbed gold on carbon and the amounts of metals in solutions have been calculated and presented in Table 5.

$$\frac{\log(\Delta \text{ [Au or Ag]}_c)}{\text{[Au or Ag]}_s} = n \log t + \log k \qquad (2)$$

Δ[Au or Ag]$_c$=change in Au or Ag on carbon from t=0 to t=t hours; [Au or Ag]$_s$=Au or Ag in solution at t=t hours; n=an experimentally derived constant for the slope of the above equation; and k=an empirical rate constant at t=1 hour.

Figure 6:
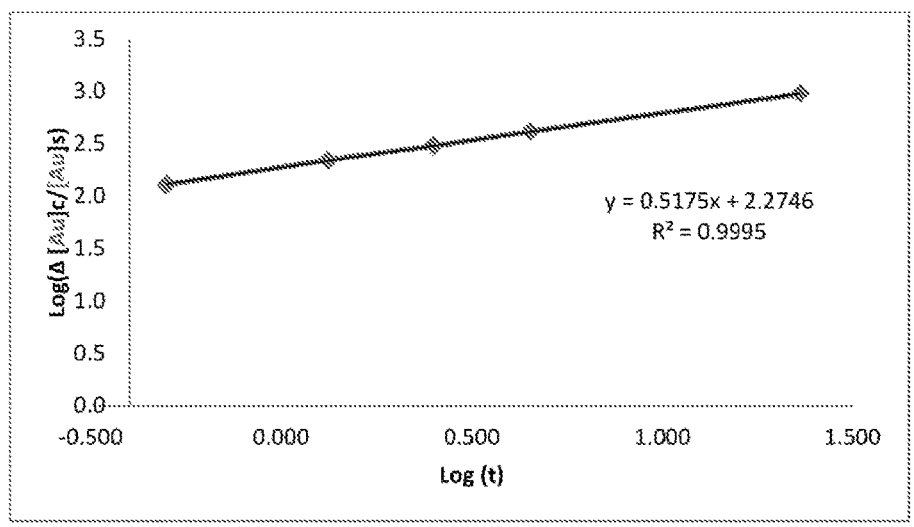
FIG. 6 is a graph showing the plot of Log ($\Delta$[Au]c/[Au]s) against Log t for pregnant solution after leaching (Loading time 23 hours, Carbon 1.55 g/L).

FIG. 6 also shows the plot of Log (Δ[Au]c/[Au]s) against (Log t) for the data shown in Table 5. The adsorption experiment shows that gold from solution containing glycine-histidine is adsorbed onto the activated carbon. The calculated carbon activity constant was 188 and the gold loading was 5.5 kg Au/ton of carbon. From the data shown in Table 5 and FIG. 6, it can be noticed that gold can be loaded onto carbon from solutions containing a mix of glycine-histidine solution.

TABLE 5

Adsorption of gold on activated carbon from glycine-histidine solutions.

| Time (min) | Time (hr) | [Au] (mg/L) | Δ[Au]s | Δ[Au]c | [Au]c/[Au]s | Log t | Log(Δ[Au]c/[Au]s) |
|---|---|---|---|---|---|---|---|
| 0 | 0 | 24.084 | 0.000 | 0 | 0 | | |
| 30 | 0.5 | 19.143 | 4.941 | 2471 | 129 | −0.301 | 2.111 |
| 80 | 1.33 | 16.656 | 7.428 | 3714 | 223 | 0.124 | 2.348 |
| 150 | 2.5 | 15.03 | 9.054 | 4527 | 301 | 0.398 | 2.479 |
| 270 | 4.5 | 13.173 | 10.911 | 5456 | 414 | 0.653 | 2.617 |
| 1380 | 23 | 8.34 | 15.744 | 7872 | 944 | 1.362 | 2.975 |

Example 5

Effect of Silver

Figure 7:
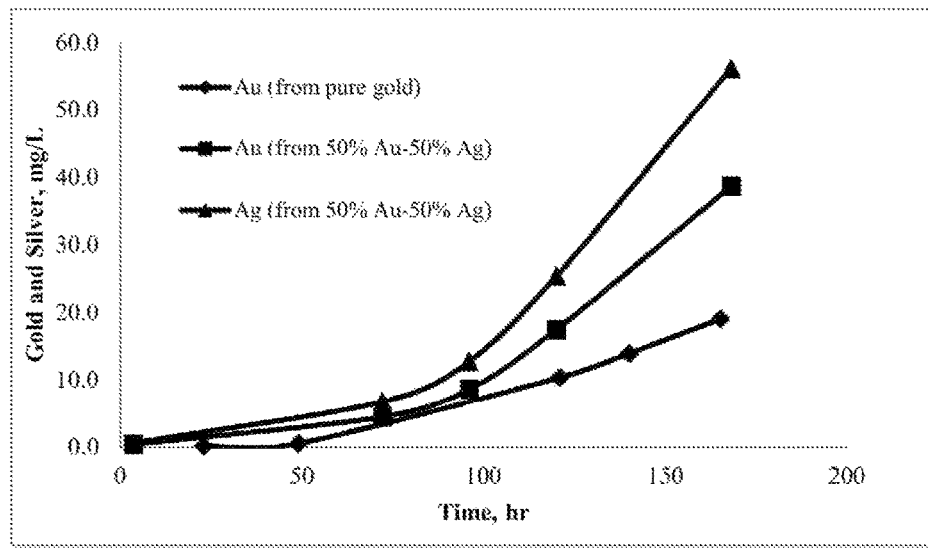
FIG. 7 is a graph showing the effect of silver on gold dissolution: 1M glycine, 1% $H_2O_2$, pH 10, 60° C.

To study the effect of silver on gold dissolution, foils (surface area 20 $cm^2$) of pure gold and 50% gold-50% silver have been leached in the solutions containing glycine and peroxide. Gold and silver dissolution from pure gold and gold-silver alloy are shown in FIG. 7. It can be seen that the presence of silver enhances gold dissolution and silver dissolves faster than gold in glycine solution.

Table 6 show the gold and silver leach rate after 168 hours from pure gold and 50% gold-50% silver. It can be seen that gold leach rate from gold-silver alloy is about 6 times higher than rate from pure gold. Silver leach rate is higher than gold in glycine-peroxide solutions.

TABLE 6

Gold and silver leach rates from pure gold and gold-silver alloy: Glycine, 1% $H_2O_2$, pH 10, 60° C.

| Au, Ag Source | Au, $10^3 \times \mu mol/m^2 \cdot s$ |
|---|---|
| Gold from (pure gold sheet) | 31.3 |
| Gold (from 50% Au—50% Ag) | 185 |
| Silver (from 50% Au—50% Ag) | 247 |

Example 6

Effect of Temperature

Figure 8:
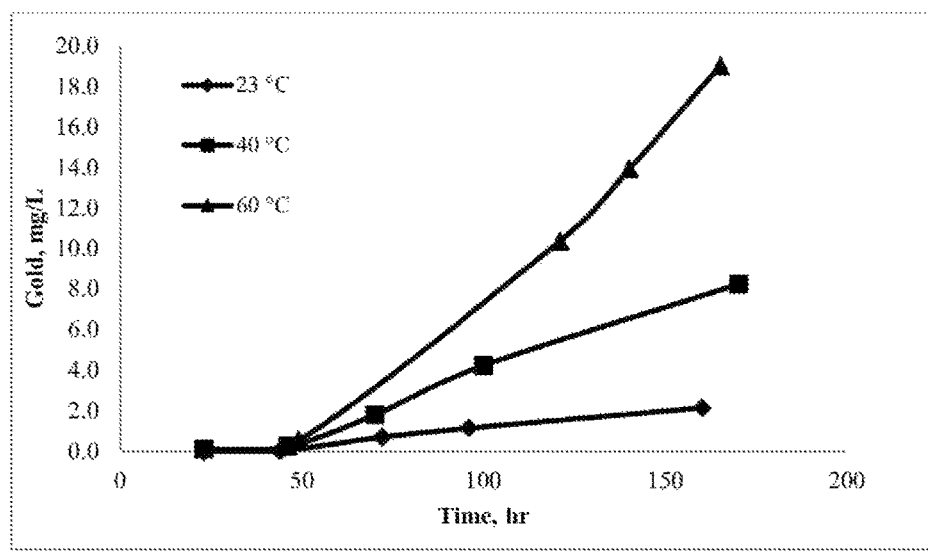
FIG. 8 is a graph showing the effect of temperature on gold dissolution: 1M glycine, 1% $H_2O_2$, pH 10, at different temperatures.
Figure 9:
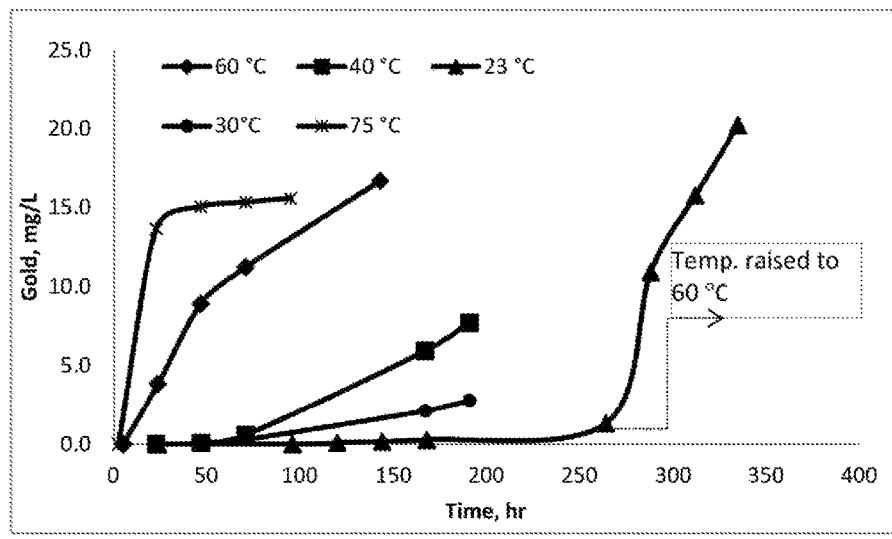
FIG. 9 is a graph showing the effect of temperature on gold dissolution: 0.1M glycine, 1% $H_2O_2$, initial pH 11.5, at different temperatures.
Figure 10:
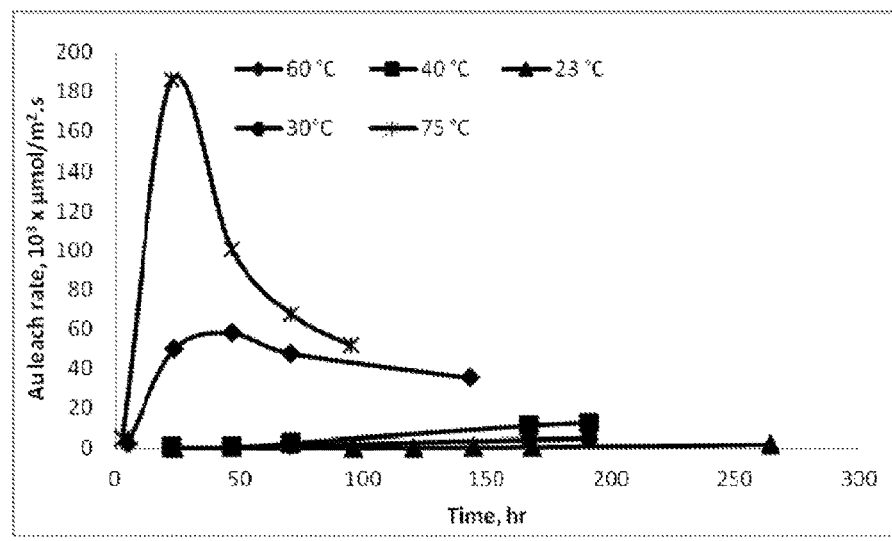
FIG. 10 is a graph showing effect of temperature on gold dissolution rate over leaching time: 0.1M glycine, 1% $H_2O_2$, initial pH 11.5, at different temperatures.

The effect of temperature on gold dissolution is shown in FIGS. 8, 9 and 10.

FIG. 8 shows the effect of temperature on the kinetics of gold leaching in a solution containing 1M glycine, 1% $H_2O_2$, at pH 10. It can be seen that gold dissolution increases dramatically as the temperature increases from 23 to 60° C.

FIG. 9 shows the effect of temperature on the kinetics of gold leaching at 0.1M glycine concentration at temperatures of 23, 30, 40, 60 and 75° C. Clearly, it can be seen that gold dissolution increases dramatically as the temperature increases. However at high temperature (75° C.) it was found that the initial gold dissolution is faster but the gold leach rate decreases rapidly.

Gold leaching is a chemically controlled process in which temperature mostly affects the reaction rate. The most interesting results shown in FIG. 9 that after 264 h of leaching at room temperature, gold dissolution rate increased dramatically once the temperature has been raised to 60° C.

FIG. 10 illustrates the gold dissolution rates over leaching time at different temperatures. It can be seen that at elevated temperature gold leach rate initially increases then starts to decrease by extending the leaching time. The average rate of gold dissolution after six days of leaching at 75° C. was $39 \times 10^{-3}$ $\mu mol/m^2 \cdot s$, which is higher than the gold leach rate of $2 \times 10^{-3}$ $\mu mol/m^2 \cdot s$ from ferric-thiosulfate system in the absence of thiourea.

Example 7

Effect of Peroxide

Figure 11:
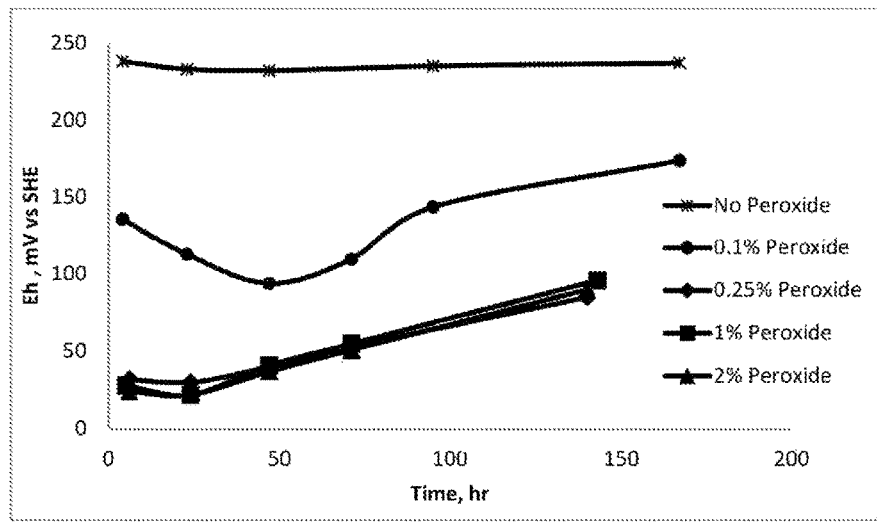
FIG. 11 is a graph showing the effect of hydrogen peroxide concentration on the measured $E_h$ of the leach solution: 0.1 M glycine, different percentages of $H_2O_2$, pH 11.5, 60° C.
Figure 12:
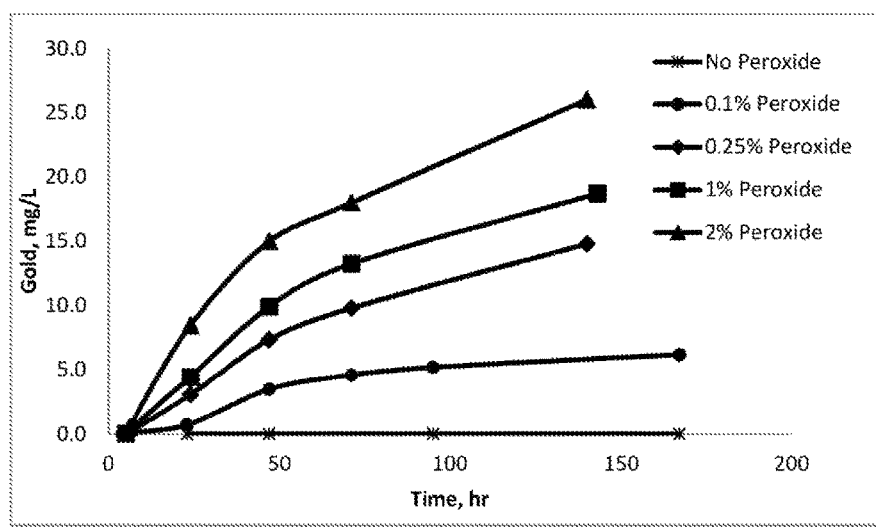
FIG. 12 is a graph showing the effect of hydrogen peroxide concentration on gold dissolution: 0.1M glycine, different percentages of $H_2O_2$, pH 11.5, 60° C.

The solution's pH and $E_h$ over time has been monitored using 90-FLMV meter. FIG. 11 shows the $E_h$ profiles of the glycine-hydrogen peroxide solutions over time at different hydrogen peroxide concentrations. It is clear to see from the results shown in FIG. 12 that the hydrogen peroxide significantly enhanced the gold dissolution. A minimum of 0.1% peroxide resulted in gold dissolution and increasing the hydrogen peroxide concentration up to 2% peroxide significantly enhances the gold dissolution.

Example 8

Effect of pH

Figure 13:
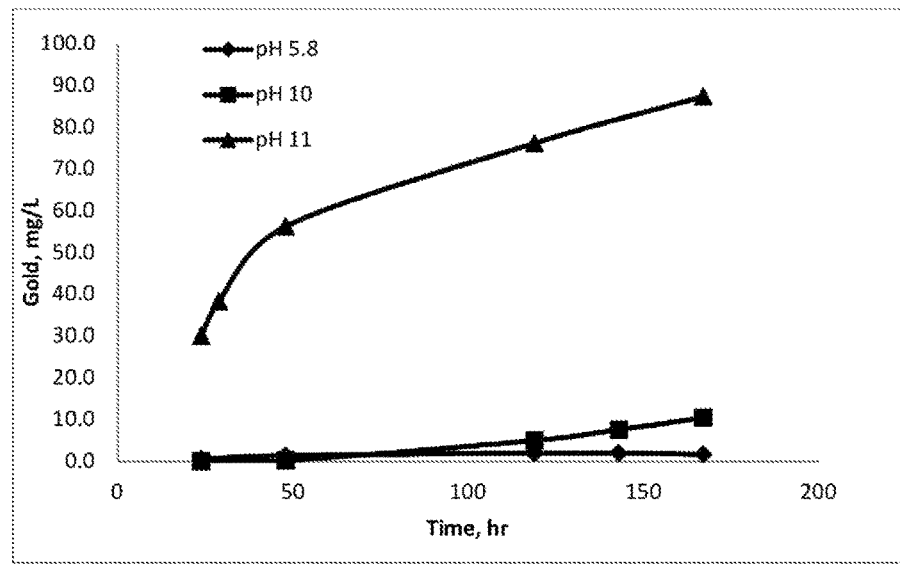
FIG. 13 is a graph showing the effect of leaching solution pH on gold dissolution: 0.5M glycine, 1% $H_2O_2$, pH, at 60° C.
Figure 14:
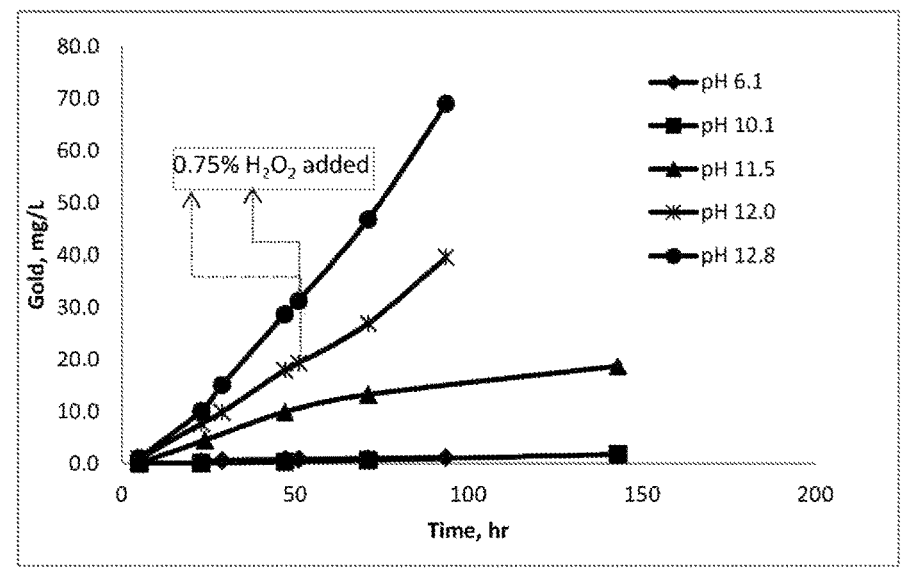
FIG. 14 is a graph showing the effect of leaching solution pH on gold dissolution: 0.1M glycine, 1% $H_2O_2$, pH, at 60° C.

The effect of pH (by adding hydroxide ions) on the gold dissolution is shown in FIGS. 13 and 14. It can be seen the glycine-peroxide system is very sensitive to the leaching pH and hydroxide ions and it can be seen that gold dissolution increases significantly by increasing the leaching pH to above pH=10.

FIG. 13 shows the effect of pH on gold leaching rate in solutions containing 0.5 M glycine and 1% peroxide at leaching temperature of 60° C. After only 24 hours of leaching at pH 11, the gold leaching rate was 0.35 $\mu mol/m^2 \cdot s$. This leaching rate is higher than the gold leaching rate (0.22-0.25 $\mu mol/m^2 \cdot s$) from 100 mM thiosulfate solutions in the presence of ferric oxidant and thiourea. Table 7 shows the gold leaching rate after different leaching times at pH 5.8, 10 and 11. The data show that gold leach rate at pH 11 is 30 times higher than the rate at pH 10 after 48 hours. However, it was found that the leach rate decreases by increasing leaching time at pH 11. The initial gold leaching rate at natural pH of solution (pH ~5.8) was faster than leaching at pH and decreased by extended the leaching time.

TABLE 7

Gold leach rate at different leaching pH: 0.5M Glycine, 1% $H_2O_2$, pH, 60° C.

| | Au, $10^3 \times \mu mol/m^2 \cdot s$ | | |
|---|---|---|---|
| Leaching time, hr | pH 5.8 | pH 10 | pH 11 |
| 24 | 8.11 | 0.59 | 352 |
| 29 | 8.75 | 1.30 | 367 |
| 48 | 5.13 | 11.47 | 322 |
| 119 | 4.19 | 14.34 | 174 |
| 167 | 3.02 | 16.93 | 142 |

The effect of adding hydroxide ions, hence, pH of solutions on the gold dissolution for a solution containing 0.1M glycine, 1% $H_2O_2$, at 60° C. is shown in FIG. 14. Again, it was found that gold dissolution in glycine-peroxide solutions is very sensitive to the leaching pH and hydroxide ions. Gold dissolution increases significantly by increasing the leaching pH to higher alkalinity.

Gold leaching rate is enhanced at pH higher than 10, preferably higher than 11 in solutions containing 0.1 M glycine and 1% peroxide at leaching temperature of 60° C.

From the results shown in FIG. 14, it can be seen that adding some more peroxide into the system enhances gold dissolution. Table 8 shows the required amounts of caustic in mM to reach the targeted pH.

TABLE 8

Required NaOH to achieve the targeted pH of the leach solution.

| Leaching pH | Required NaOH (mM) |
|---|---|
| 6.10 | 0 |
| 10.10 | 47.5 |
| 11.50 | 125.0 |
| 12.00 | 175.0 |
| 12.80 | 293.0 |

Example 9

Effect of $Cu^{2+}$

Figure 15:
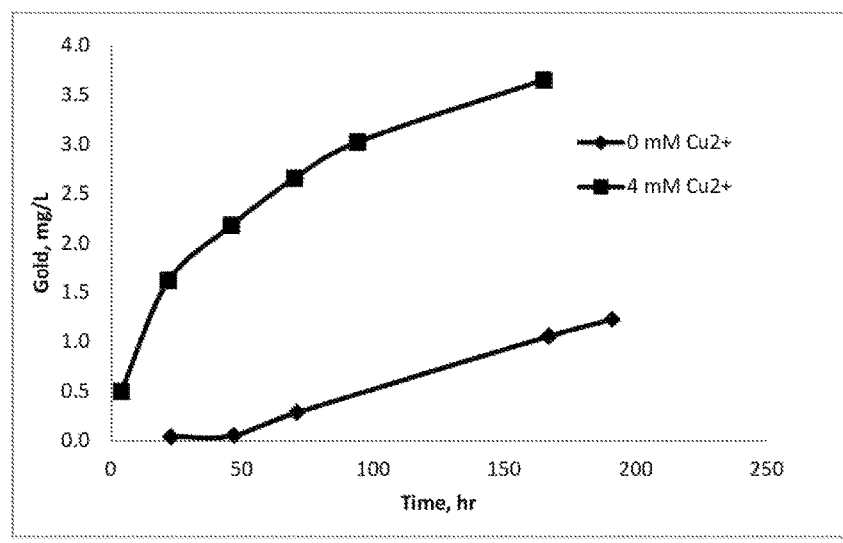
FIG. 15 is a graph showing the effect of $Cu^{2+}$ ions on gold dissolution: 0.1M glycine, 0.1% $H_2O_2$, pH 11, at 30° C.

It has been found that adding $Cu^{2+}$ to glycine-peroxide system enhances gold dissolution. FIG. 15 shows how the presence of $Cu^{2+}$ ions enhances gold dissolution in glycine-peroxide system, in a solution containing 0.1M glycine, 1% $H_2O_2$, pH 11 at 30° C.

Figure 16:
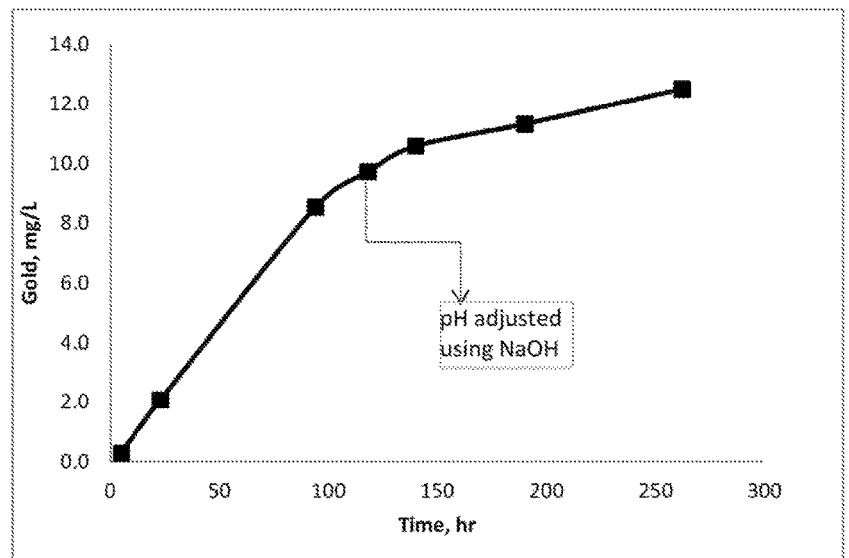
FIG. 16 is a graph showing the effect of $Cu^{2+}$ ions on gold dissolution: 0.1M glycine, 0.3% $H_2O_2$, 4 mM $Cu^{2+}$, pH 11.9 and 30° C.

An additional test has been conducted to study the effect of $Cu^{2+}$ ions on gold dissolution glycine-peroxide system by increasing the leaching pH to 11.9 and peroxide concentration to 0.3%. The amounts of dissolved gold from this system against leaching are shown in FIG. 16. A comparison between the results of FIG. 15 in the presence of $Cu^{2+}$ and FIG. 16 indicates that increasing pH and peroxide enhances gold dissolution. The gold-glycine solution in the presence of $Cu^{2+}$ ions has been successfully loaded onto activated carbon.

Example 10

Effect of Pyrite

Figure 17:
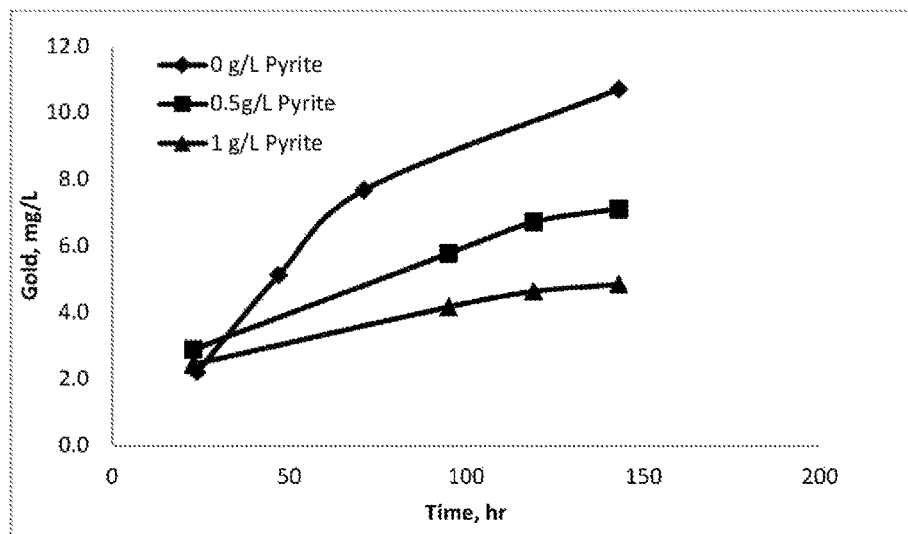
FIG. 17 is a graph showing the effect of pyrite on gold dissolution from glycine-peroxide solutions: 0.1M amino acid, 1% $H_2O_2$, pH 11, at 60° C.

Gold ore bodies may contain different gangue minerals of different reactivity; one of the most reactive minerals associated with gold is pyrite. To study the effect of pyrite, different amounts of pyrite minerals were added to the leach solution prior to gold sheet addition. FIG. 17 shows the effect of pyrite on gold dissolution in solutions containing pyrite ($FeS_2$). It is clear that gold dissolution in the presence of pyrite is lower than the measure in the absence of pyrite. The decrease in gold dissolution may be attributed to the consumption of peroxide to oxidise pyrite, or catalytic decomposition on the pyrite surface.

Example 11

Activity of Recycled Solution

Figure 18:
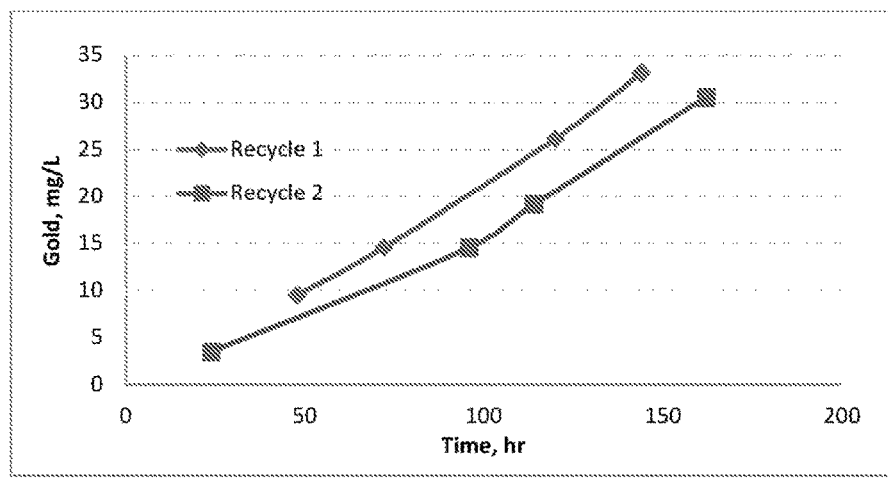
FIG. 18 is a graph showing gold dissolutions in recycled barren solutions containing initially 1M glycine and 1% peroxide at 60° C. and pH 10.

Leaching tests were conducted using a recycled barren solution after gold and silver adsorption. A once or twice recycled barren solution was used to leach pure gold sheet of 1 cm width and 10 cm length. The results of these tests are shown in FIG. 18. It can be seen that the recycled leach solution leaches gold very effectively over time. The results shown in FIG. 18 illustrate that the leachant and process are robust in terms of reagent stability over time.

Example 12

Effect of Solution Aging

Figure 19:
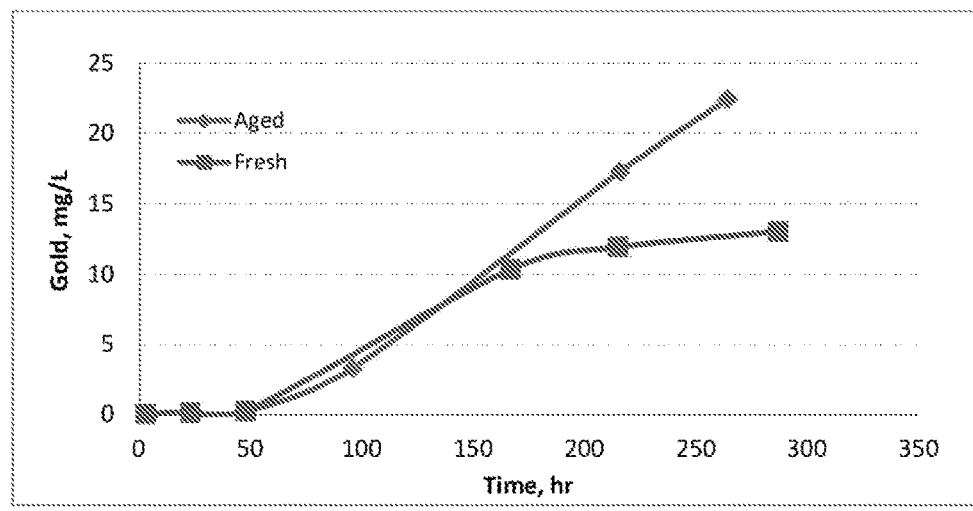
FIG. 19 is a graph showing gold dissolutions in fresh and aged solutions containing initially 1M glycine and 1% peroxide at 60° C. and pH 10.

A solution of 1M of glycine and 1% of peroxide has been left 4 days at room temperature. After aging, gold was added into the aged solution and samples were taken frequently and analysed for gold using ICP-OES. The results of gold leaching in fresh and aged solutions are shown in FIG. 19.

Figure 20:
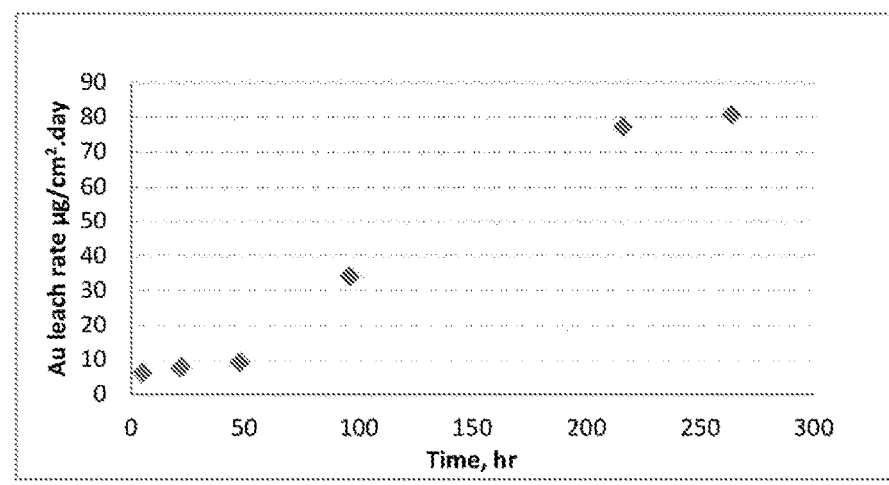
FIG. 20 is a graph showing gold leaching rates in solutions containing initially 1M glycine and 1% peroxide at 60° C. and pH 10.

The results illustrate that gold dissolves faster with a higher leaching rate in the aged solution than the fresh solution. Gold leach rate in aged solution and fresh solutions after 215 hours was 0.045 and 0.032 µmol/m²·s respectively. FIG. 20 shows the gold leach rate during 264 hours leaching in a solution containing 1M of glycine and 1% of peroxide. It is interesting to see that gold leach rate increases over leaching time.

Example 13 pH and Eh Over Time

The electrochemical potential (Eh) and pH of the leach solution were measured over 19 days of leaching. Table 9 shows the values of pH and Eh over time for 456 hours of leaching. It can be seen that pH and Eh are reasonably stable over this time, again indicating the reagent stability.

TABLE 9 pH and Eh over leaching time in solutions containing 1M glycine and 1% peroxide at 60° C.

| Time, hr | pH | $E_h$ (mV) |
| --- | --- | --- |
| 3 | 9.3 | −128 |
| 23 | 9.3 | −117 |
| 48 | 9.25 | −112 |
| 167 | 9.21 | −117 |
| 215 | 9.24 | −118 |
| 287 | 9.19 | −115 |
| 384 | 9.18 | −121 |
| 456 | 9.21 | −115 |

Example 14

Extended Leaching Time at 40 C

Figure 21:
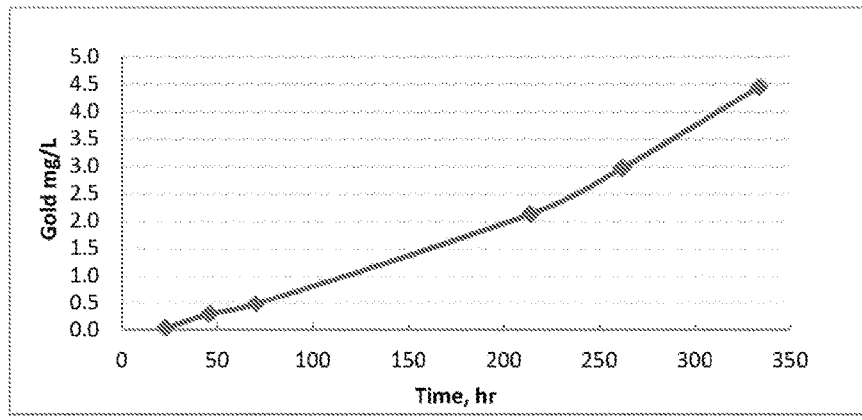
FIG. 21 is a graph showing gold concentration in solution containing 1M glycine, 1% peroxide, 5 mM Cu(II) at 40° C. and pH 10.

In this experiment, a solution containing 1M of glycine, 1% of hydrogen peroxide and 5 mM Cu(II) has been used at temperature of 40° C. Pure metallic gold as gold foil of 36 cm² surface area has been used in this example. FIG. 21 shows the amount of dissolved gold in solution (400 mL) containing 1M of glycine, 1% of hydrogen peroxide and 5 mM Cu(II). It can be seen that gold also dissolves at this condition in reasonable amounts.

Figure 22:
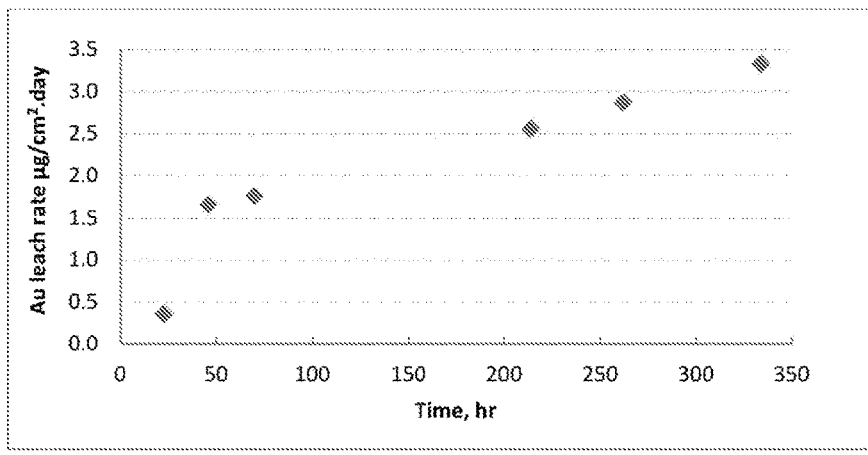
FIG. 22 is a graph showing gold leach rate in solution containing 1M glycine, 1% peroxide, 5 mM Cu(II) at 40° C. and pH 10.

The most interesting results from this example are that gold leach rate increases over time (most of the gold leaching alternatives processes showed decreasing gold leach rate over time). These results reflect the robust stability of the reagents in the leach solution. The experiment was left run for about 14 days (334 hours). FIG. 21 shows the amount of dissolved gold in leach solution over time and FIG. 22 shows gold leaching rate in µg/cm²·day over the whole period of leaching. In this robust system, solution pH did not change over 14 days leaching time and the Eh was fluctuating between −50 mV to −40 mV.

Example 15

Adsorption of Gold on Activated Carbon

Different amounts of activated carbon were added into the leach pregnant solutions from Examples 12 and 13. Samples from different adsorption tests were taken at intervals and analysed by ICP-OES. The adsorbed gold on carbon and the amounts of gold in solutions have been calculated and presented in Tables 10, 11, and 12.

The Kinetics of gold and silver adsorption onto activated carbon has also been evaluated by the determination of the carbon activity constant using the following equation (3):

$$\log(\text{delta}[\text{Au or Ag}]c/[\text{Au or Ag}]s) = n \log t + \log k \qquad (3)$$

Where:

delta [Au or Ag]c=change in [Au or Ag] on carbon from t=0 to t=t hours

Figure 23:
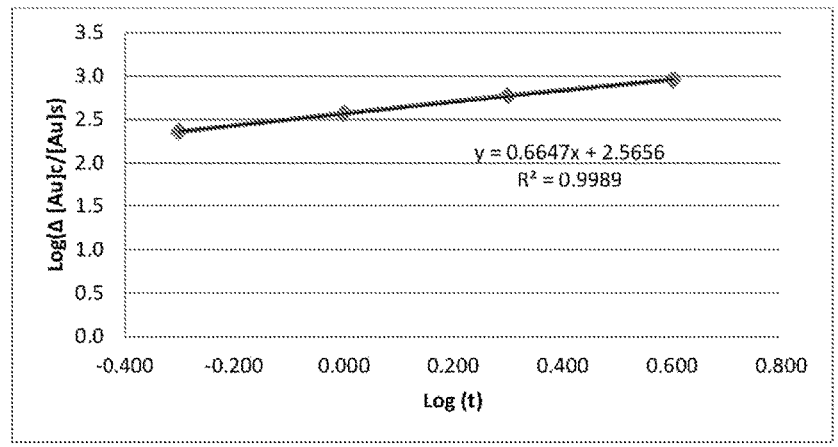
FIG. 23 is a graph showing Log ($\Delta$[Au]c/[Au]s) against Log t for pregnant solution after leaching for 15 days (Loading time 4 hours, Carbon 1.466 g/L).

[Au or Ag]s=[Au or Ag] in solution at t=t hours n=an experimentally derived constant for the slope of the above equation.
k=an empirical rate constant at t=1 hour
r2=the correlation coefficient of the above equation As an example to show the activity of gold adsorption onto carbon, FIG. 23 shows the plot of Log (Δ[Au]c/[Au]s) against (Log t) for the data shown in Table 10.

The different adsorption experiments indicate that the leached gold using the process of the disclosure could be adsorbed onto activated carbon at a similar rate as gold cyanide complexes.

It can also be seen from the data shown in Tables 11 and 12 that silver is slightly adsorbed on the activated carbon and the presence of silver enhances gold loading on carbon.

TABLE 10

Adsorption of gold on activated carbon from pregnant solution after leaching for 456 hours (Solution volume 350 mL).
Carbon dry weight 0.513 g
Loading (4 hrs) = 6.2 Kg/t

| Time min | Time (hrs) | [Au] mg/L | Δ[Au]s | Δ[Au]c | [Au]c/[Au]s | Log t | log [Au]c/[Au]s |
|---|---|---|---|---|---|---|---|
| 0 | 0.0 | 15.5 | 0.000 | 0 | 0 | | |
| 30 | 0.5 | 11.6 | 3.882 | 2649 | 229 | −0.301 | 2.359 |
| 60 | 1.0 | 9.96 | 5.504 | 3701 | 372 | 0.000 | 2.570 |
| 120 | 2.0 | 8.14 | 7.321 | 4852 | 596 | 0.301 | 2.775 |
| 240 | 4.0 | 6.47 | 8.993 | 5872 | 908 | 0.602 | 2.958 |

TABLE 11

Adsorption of gold on activated carbon from pregnant solution after leaching gold/silver alloys for 168 hours (Solution volume 380 mL).
Carbon dry weight 0.816 g
Loading (4 hrs) = 10.5 Kg/t

| Time (min) | Time (hrs) | [Au] mg/L | Δ[Au]s | Δ[Au]c | [Au]c/[Au]s | Log t | log [Au]c/[Au]s |
|---|---|---|---|---|---|---|---|
| 0 | 0.00 | 32.54 | 0.000 | 0 | 0 | | |
| 30 | 0.50 | 24.33 | 8.210 | 3823 | 157 | −0.301 | 2.196 |
| 96 | 1.60 | 15.87 | 16.670 | 7763 | 489 | 0.204 | 2.689 |
| 180 | 3.00 | 11.55 | 20.990 | 9775 | 846 | 0.477 | 2.928 |
| 240 | 4.00 | 9.78 | 22.760 | 10599 | 1084 | 0.602 | 3.035 |

TABLE 12

Adsorption of silver on activated carbon from pregnant solution after leaching gold/silver alloys for 168 hours (Solution volume 380 mL).
Carbon dry weight 0.816 g
Loading (4 hrs) = 1.54 Kg/t

| Time (min) | Time (hrs) | [Ag] mg/L | Δ[Ag]s | Δ[Ag]c | [Ag]c/[Ag]s | Log t | log[Ag]c/[Ag]s |
|---|---|---|---|---|---|---|---|
| 0 | 0.00 | 59.51 | 0.000 | 0 | 0 | | |
| 30 | 0.50 | 56.32 | 3.190 | 1454 | 26 | −0.301 | 1.412 |
| 96 | 1.60 | 54.33 | 5.180 | 2361 | 43 | 0.204 | 1.638 |
| 180 | 3.00 | 52.43 | 7.080 | 3228 | 62 | 0.477 | 1.789 |
| 240 | 4.00 | 51.59 | 7.920 | 3611 | 70 | 0.602 | 1.845 |

Examples 16 to 21

Recovery of Copper

The following Examples 16 to 21 detail the recovery of copper from a copper-gold gravity concentrate. However, it is to be understood that the process of the present disclosure is not limited to recovery of copper from copper-gold concentrates, and can be also applied to the recovery of copper from other copper containing materials, such as copper ore concentrates that do not contain gold.

A copper-gold gravity concentrate was produced from the cyclone underflow feeding into a batch centrifugal gravity separator at a copper-gold plant in Western Australia. The gravity concentrate conveniently concentrated many non-sulphide minerals of copper, and native copper, as well as sulphide minerals, with gold to provide a wide distribution of copper mineralogy. The gravity concentrate sample was then ground using a disc mill and screened using 150 and 106 μm screens. The +150 μm was recycled back to the mill.

The particle size of the ground sample used in the leaching experiments was 100% −150 μm and 80% −106 μm. The sample was sent for elemental analysis using acid digestion followed by solutions analysis for different metals using inductively coupled plasma optical emission spectrometry (ICP-OES). The mineralogical compositions of the gravity concentrate before and after leaching were analysed by an integrated automated mineralogy solution providing quantitative analysis of minerals using quantitative evaluation of minerals by scanning electron microscopy (QEM-SCAN) technique.

All Examples were carried out using solutions prepared from analytical grade reagents and Millipore water. Unless specified, all experiments are conducted using a bottle roller in accordance with conventional laboratory practice. The concentrate and glycine solution were placed in a 2.5 L Winchester bottle. The slurry was agitated by rolling the bottle on a bottle roll at 150 rpm. Bottles were vented to allow for oxygen transfer, ensuring that a lack of oxygen did not limit the reaction rate.

At different times, samples of the leach solution were obtained using a syringe-membrane filter (pore size 0.45 μm). The filtrates were analysed for copper and iron by using atomic adsorption spectroscopy. The trace elements were analysed using inductively coupled plasma optical emission spectrometry (ICP-OES). The elemental analysis of residue was conducted using acid digestion followed by ICP-OES analysis.

From the data shown in Table 13, it can be seen that of the common copper minerals, chalcopyrite ($CuFeS_2$) is the least soluble in cyanide and other copper oxides and native copper show high solubility in cyanide solutions.

TABLE 13

Solubility of Cu Minerals in 1% NaCN Solution

| Mineral | Formula | % Copper dissolved |
|---|---|---|
| Azurite | $2Cu(CO)_3 \cdot Cu(OH)_2$ | 94.5 |
| Malachite | $2CuCO_3(OH)_2$ | 90.2 |
| Chalcocite | $Cu_2S$ | 90.2 |
| Covellite | $CuS$ | 95.6 |
| Chalcopyrite | $CuFeS_2$ | 5.60 |
| Native Copper | $Cu$ | 90.0 |
| Cuprite | $Cu_2O$ | 85.5 |
| Bornite | $FeS \cdot 2Cu_2S$ | 70.0 |
| Enargite | $Cu_3AsS_4$ | 65.8 |
| Tetrahedrite | $(Cu \cdot Fe \cdot Ag \cdot Zn)12Sb_4S_{13}$ | 21.9 |
| Chrysocolla | $CuSiO_3 \cdot (nH_2O)$ | 11.8 |

Table 14 shows the elemental analysis of the copper-gold concentrate used in Examples 16 to 21. The copper-gold concentrate has 3.75% Cu distributed amongst a range of copper minerals, including native copper.

TABLE 14

Elemental analysis of the copper-gold concentrate
Concentration (%)

| Sample ID | Au | Ag | Cu | As | Fe | Si | Ni | Al | K | Co | Pb | S |
|---|---|---|---|---|---|---|---|---|---|---|---|---|
| Conc. | 0.213 | 0.03 | 3.75 | 0.76 | 11.6 | 27.0 | 0.06 | 2.0 | 0.69 | 0.34 | 0.12 | 11.4 |

Example 16

Two-Stage Leaching

Figure 24:
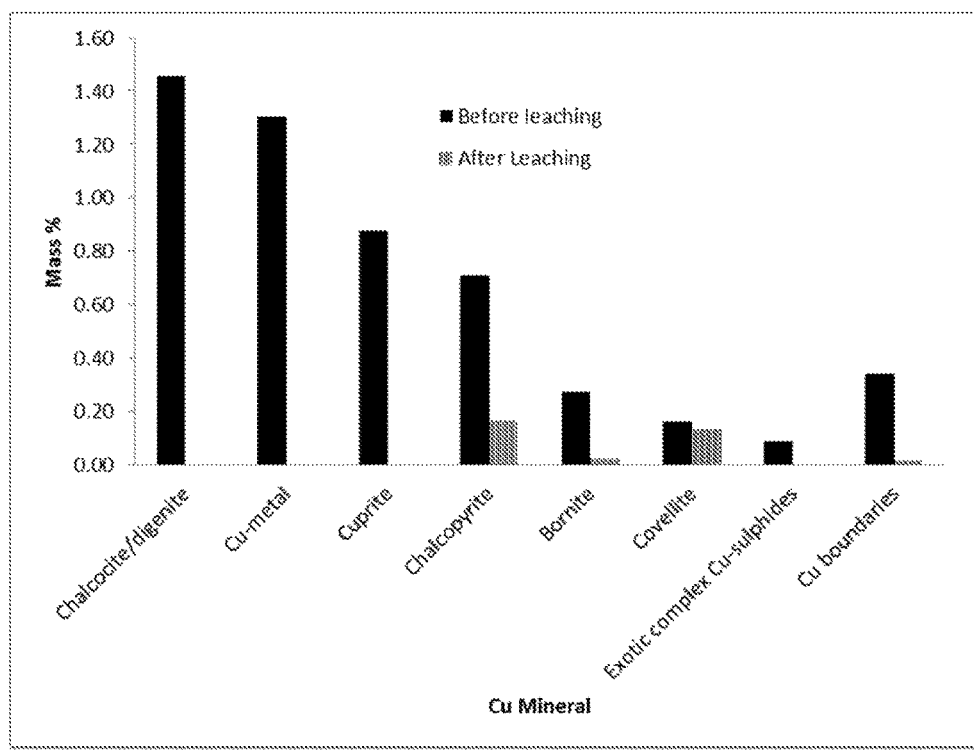
FIG. 24 is a graph showing mass % of Copper minerals in a copper concentrate before and after leaching in glycine solutions (Leaching conditions: two-stages, 0.3 M glycine, 1% peroxide, room temperature, pH 11, 48 hours).

The experiments showed that 98% of Cu was extracted in 48 hours in a two stage leach under the following conditions: 0.3 M Glycine, 1% $H_2O_2$, pH 11.0, 23° C. and 16% (% w/w) pulp density. The mineralogical compositions of the copper-gold concentrate before and after leaching were analysed by QEMSCAN are shown in Table 15. FIG. 24 shows also the mass percentages for each copper mineral in the concentrate before and after leaching. The results presented in FIG. 24 show that 100% of the metallic copper and sulfide copper minerals, such as bornite and chalcocite/digenite, were dissolved. About 80% of chalcopyrite was dissolved. QEMScan analysis of the residue showed that the unleached chalcopyrite occurred as liberated particles in the largest size fraction.

TABLE 15

The mineralogical analysis of copper and gangue minerals in the concentrate before and after leaching (Leaching conditions: 0.3M Glycine, 1% $H_2O_2$, pH 11, room temperature)
Bulk Mineralogy, Mass %

| Mineral | Before Leaching | After leaching |
|---|---|---|
| Chalcocite/digenite | 1.46 | 0.01 |
| Cu-metal | 1.30 | 0.00 |
| Cuprite | 0.88 | 0.00 |
| Chalcopyrite | 0.71 | 0.15 |
| Bornite | 0.27 | 0.02 |
| Covellite | 0.18 | 0.12 |
| Exotic complex Cu-sulphides | 0.09 | 0.00 |
| Cu boundaries | 0.34 | 0.02 |
| Pyrite | 28.55 | 32.33 |
| Pyrrhotite | 0.35 | 0.20 |
| Arsenopyrite | 0.01 | 0.00 |
| Quartz | 48.49 | 51.28 |
| Feldpars | 5.32 | 5.59 |
| Calcite | 0.12 | 0.10 |
| Dolomite | 0.09 | 0.11 |
| Ankerite/Dolomite | 0.78 | 0.61 |
| Rutile/Anatase/Ilmenite | 0.52 | 0.75 |
| Hematite | 0.69 | 1.71 |
| Goethite | 2.72 | 2.21 |
| Other | 7.16 | 4.75 |

Table 16 presents the percentage of each copper mineral dissolved after leaching in glycine solution. The presence of covellite (CuS) in the final residue may be attributed to the re-precipitation of copper during leaching according to Eq. (2). The formation of covellite (CuS) during the leaching of copper sulfide minerals, such as chalcopyrite, has been identified by some studies. It can be concluded that covellite dissolves in the leach solutions and re-precipitates by the reaction of copper with either sulfur or sulfide during the leaching.

$$Cu + S^0 \rightarrow CuS \text{ or}$$

$$Cu_2S \rightarrow CuS + Cu^{2+} + 2e^- \quad (4)$$

TABLE 16

The observed dissolution of copper minerals in 0.3M glycine solution at room temperature, 1% $H_2O_2$, pH 11.

| Mineral | Cu dissolution, % |
|---|---|
| Chalcocite/digenite | 100 |
| Cu-metal | 100 |
| Cuprite | 100 |
| Chalcopyrite | 80 |
| Bornite | 92 |
| Covellite | 19 |
| Exotic complex Cu-sulphides | 99 |
| Cu boundaries | 95 |

Figure 25:
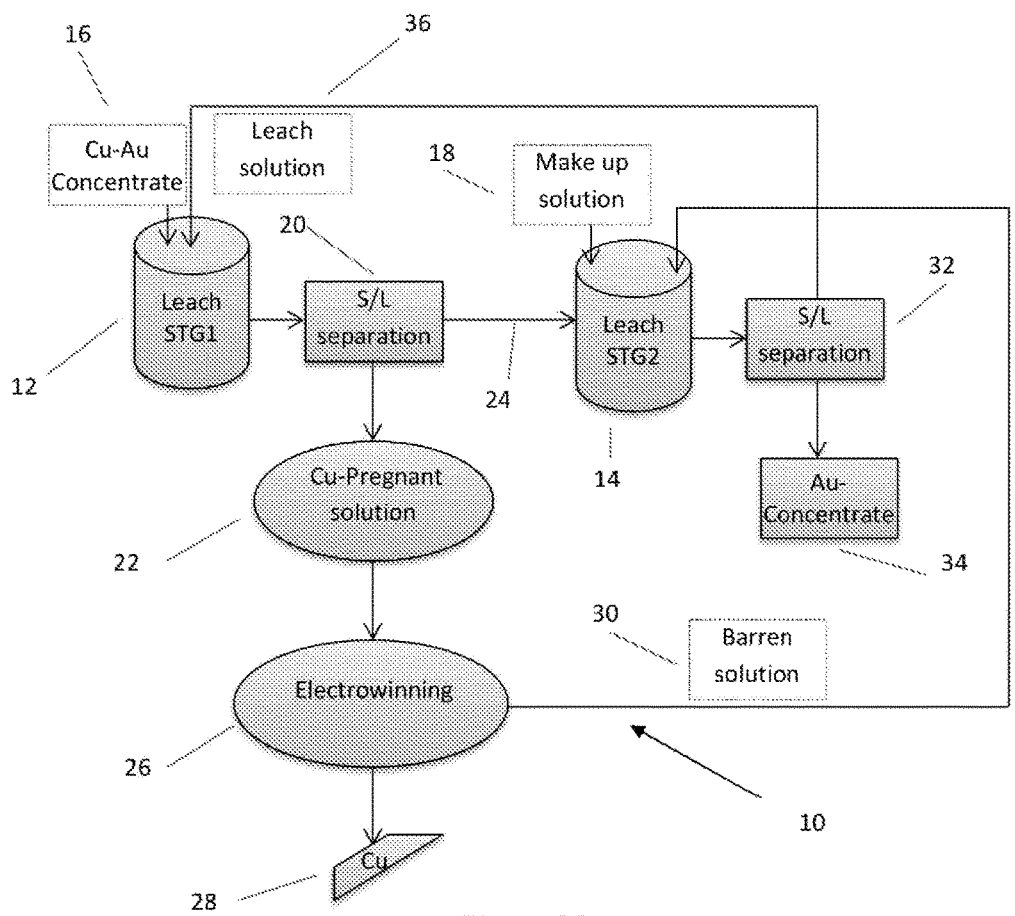
FIG. 25 is a schematic diagram for two-stage counter-current copper leach process.

FIG. 25 shows the schematic diagram of a conceptual two-stage counter-current copper leach circuit, indicated generally by reference numeral 10. In order to achieve a high copper dissolution, the leaching can be conducted in two stages 12, 14 (such as by using two leaching reactors) with identical leaching conditions in each stage. At the steady state, fresh Cu—Au concentrate 16 will feed the first stage 12 and fresh (make up) leaching solution 18 will feed the second stage 14. The leached slurry exiting stage 12 is subjected to a first solid/liquid separation, 20, to produce a first copper pregnant leach solution, 22, and solid leach residue, 24. The residue 24 is fed to the second leach stage 14. The leached slurry exiting the second leach stage 14 is subjected to a second solid/liquid separation, 32, to produce the gold concentrate, 34 and a second copper PLS, 36. The second PLS is recycled to the first leach stage 12 as leach solution. The copper containing pregnant leach solution, 22, is subjected to electrowinning, 26, and recovery of copper, 28. The barren solution 30 from the electrowinning step 26 is recycled as process solution for the second leach stage 14. Table 18 shows the copper and other impurities concentrations in the final leach solution from stages 1 and 2.

TABLE 17

Copper and impurities concentrations in stage 1 and 2 final leach solutions
Concentration (mg/L)

| Sample ID | Cu | Au | As | S | Fe | Si | Ni | Co | Pb | K | Mg | Ca |
|---|---|---|---|---|---|---|---|---|---|---|---|---|
| STAGE1 | 4745 | 0.85 | 24.7 | 185 | 12.1 | 9.14 | 5.21 | 3.14 | 16.4 | 14.8 | 14.4 | 25.1 |
| STAGE2 | 1069 | 1.28 | 29.4 | 146 | 6.69 | 6.45 | 4.34 | 2.27 | 10.2 | 9.2 | 2.99 | 14.1 |

About 98% of copper was leached using 0.3 mol/L glycine at room temperature with only about 12 mg/L Fe, 16 mg/L Pb and low impurities concentration transferred into the pregnant solution. It appears that iron does not dissolve significantly in the alkaline glycine solutions.

Figure 26:
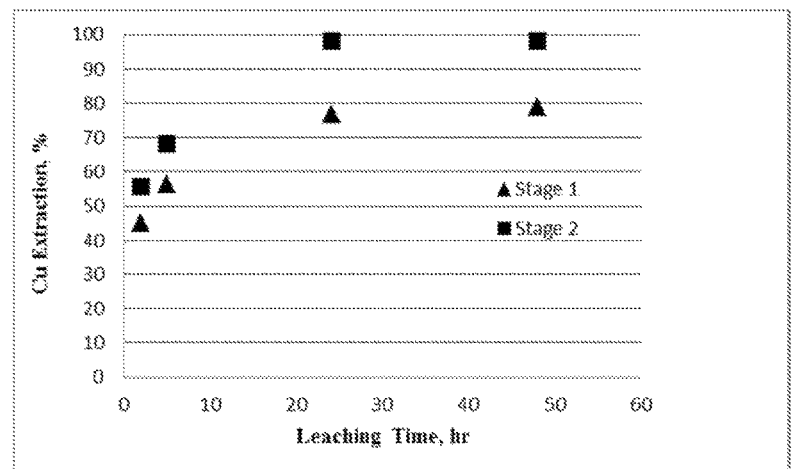
FIG. 26 is a graph showing copper extraction (%) against leaching time (hours) from Cu—Au concentrate after two-stages leaching.

FIG. 26 shows the copper dissolution as a function of time after leaching in two stages. It can be seen that more than 98% of copper has been dissolved. It can also be observed that, after 5 hours leaching, copper extraction is about 66% of copper and this initial rapid dissolution of copper is due to the presence of the highly soluble cuprite and metallic copper in the concentrate.

Example 17

Single Stage Leaching

Figure 27:
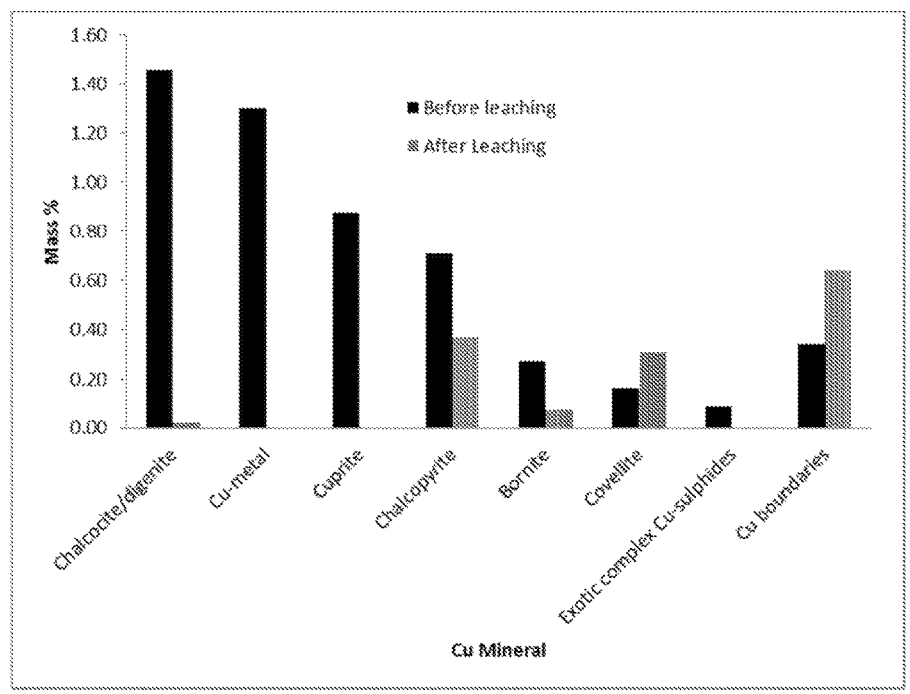
FIG. 27 is a graph showing mass % of copper minerals in a copper concentrate before and after leaching in glycine solutions (Leaching conditions: one-stage, 0.4 M glycine, 1% peroxide, room temperature, pH 11.5, 96 hours).

In this section, leaching of a copper-gold concentrate is performed in a single stage by increasing glycine concentration from 0.3 M to 0.4 M and extending the leaching time to 96 hours. FIG. 27 shows the mass percent of the copper minerals analysed by QEMSCAN before and after leaching for a comparison. From the copper concentration in the final leach solution, and copper in the final residue, the copper extraction was 82%. From the results shown in FIG. 27, it is apparent that 100% of chalcocite, cuprite, metallic copper, and only 50% of chalcopyrite have been dissolved. It is interesting to observe that, as shown in FIG. 27, copper has been re-precipitated as a covellite (CuS) or as very fine copper either adsorbed on clays or incorporated in the silicates (Cu-boundaries).

Example 18

Effect of pH

Figure 28:
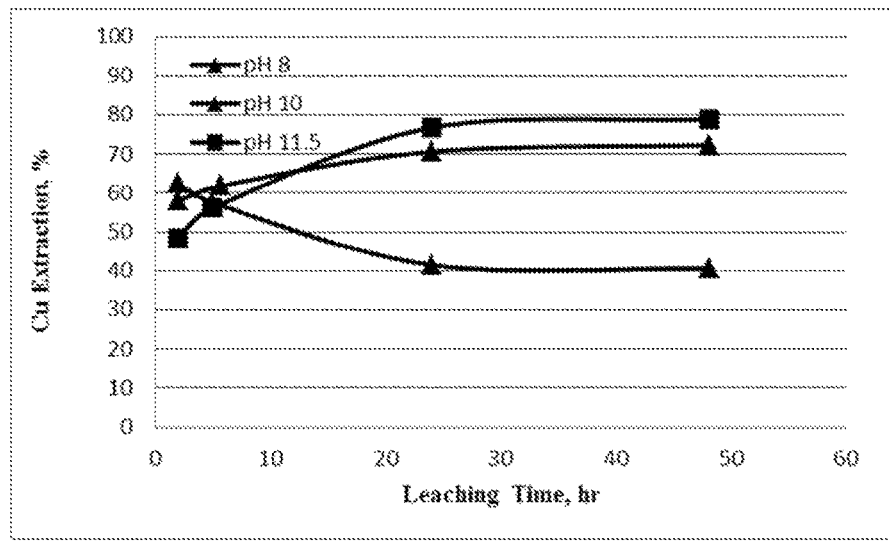
FIG. 28 is a graph showing copper extraction (%) against leaching time (hours) at different solution pHs (0.3M glycine, 1% $H_2O_2$, room temperature).

The effect of leaching solution pH on copper dissolution is shown in FIG. 28. It can be seen the initial copper dissolution at lower pH (pH 8.0) is higher than the dissolution at pH 10 and 11.5. However, by extending the leaching time it was found that the copper dissolution increases at more alkaline pH (eg, pH 11.5). From the results shown in FIG. 28, it can be observed that copper dissolution slightly increases by increasing the leaching pH from pH 10 to pH 11.5.

Example 19

Effect of Peroxide

Figure 29:
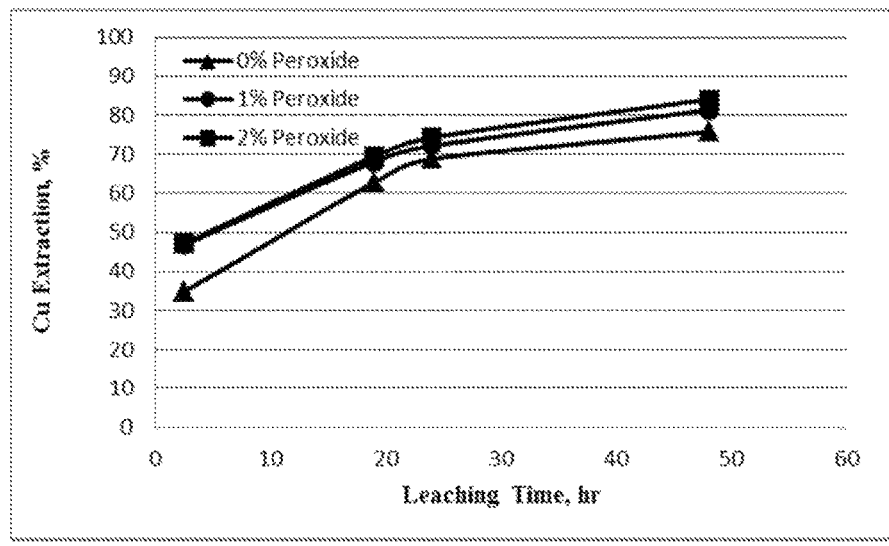
FIG. 29 is a graph showing copper extraction (%) against leaching time (hours) at different peroxide concentrations (0.3M glycine, pH 11, room temperature, 10% pulp density).

To study the effect of using peroxide as an oxidant on copper leaching in glycine solution, 0%, 1% and 2% of peroxide were added to 0.3M glycine solution at room temperature. The results shown in FIG. 29 show that peroxide slightly increases copper dissolution.

The most interesting result here is that copper extraction reaches up to 75% in a solution containing only glycine (no peroxide) on a vented bottle roll that allows enough oxygen transfer from surrounding air.

Example 20

Effect of Pulp Density

Figure 30:
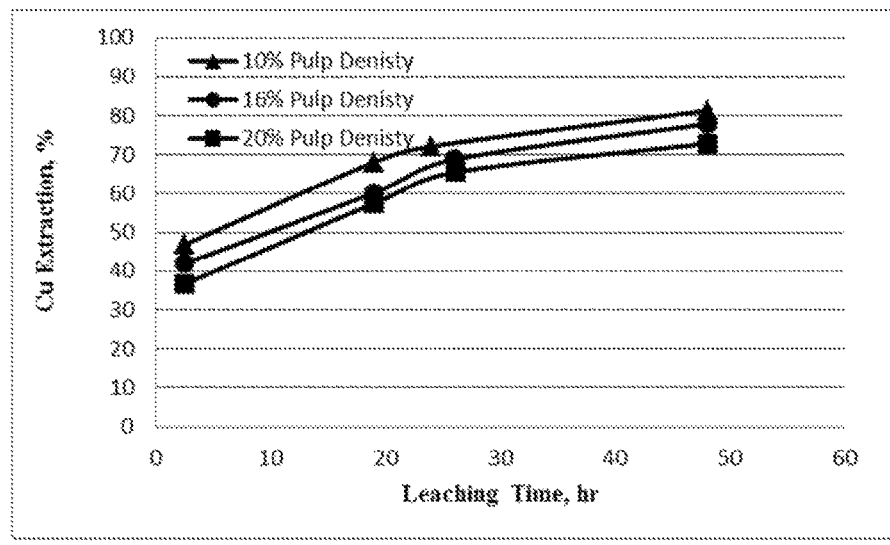
FIG. 30 is a graph showing copper extraction (%) against leaching time (hours) at different pulp densities (0.3M glycine, 1% $H_2O_2$, pH 11, room temperature).

To study the effect of pulp density on copper leaching in glycine solution, 10, 16 and 20% pulp densities were used. The effect of pulp density on copper dissolution is shown in FIG. 30. Increasing the pulp density from 10% to 20% decreases the copper extraction by about 10%. It is believed that the decrease of copper extraction at a higher pulp density can be attributed principally to the efficiency of oxygen transfer to the leach solution.

Example 21

Effect of Glycine Concentration

Figure 31:
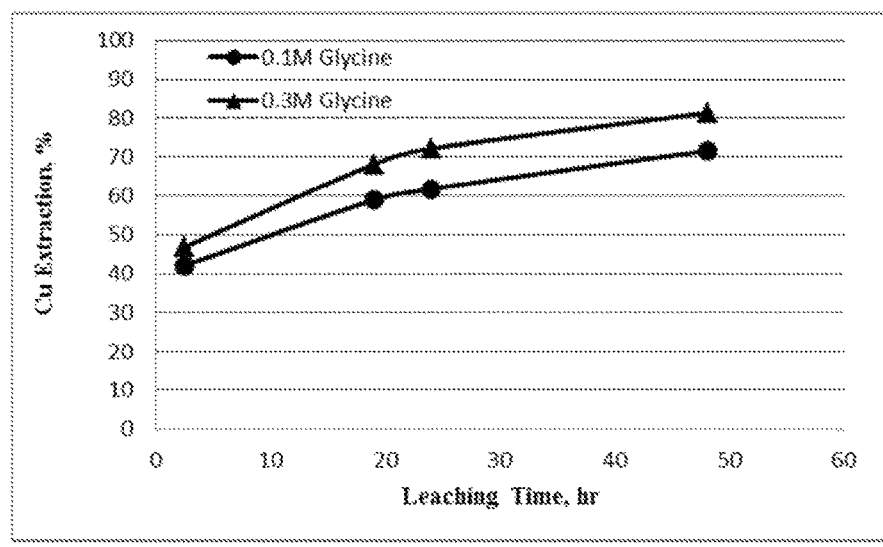
FIG. 31 is a graph showing copper extraction (%) against leaching time (hours) at different glycine concentrations (1% $H_2O_2$, pH 11, room temperature, 10% pulp density).

The effect of glycine concentration on the copper dissolution is shown in FIG. 31. It is clear that by increasing the glycine concentration, the copper extraction slightly increases. It can be generally reported that copper dissolution depends on the concentration of glycine in the glycine-peroxide solutions.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

Further patent applications may be filed in Australia or overseas on the basis of, or claiming priority from, the present application. It is to be understood that the following provisional claims are provided by use of example only and are not intended to limit the scope of what may be claimed in any such future applications. Features may be added to or omitted from the provisional claims at a later date so is to further define or re-define the invention or inventions.

The invention claimed is:

1. A process for recovery of metal comprising copper and/or a precious metal from a metal containing material, including the steps of:
    leaching the metal containing material with an aqueous alkaline solution having a pH of at least 9 and containing a lixiviant comprising an amino acid or derivative thereof in order to produce a metal containing leachate; and
    extracting the metal from the leachate,
    wherein the amino acid comprises glycine.

2. The process of claim 1, wherein the metal comprises a precious metal and the leaching step comprises leaching a precious metal containing material with an alkaline solution containing an oxidant and the amino acid or derivative thereof at an elevated temperature in order to produce a precious metal containing leachate.

3. The process of claim 2, wherein the oxidant is a peroxide, manganese dioxide, or an oxygen containing gas.

4. The process of claim 3, wherein the oxidant is hydrogen peroxide and the amount of hydrogen peroxide in solution is at least 0.005 wt %, and is a maximum of 5 wt %.

5. The process of claim 3, wherein the leachant further includes a leaching catalyst comprising cupric (copper(II)) species, present in a concentration of at least 1mM and up to 10 mM.

6. The process of claim 2, wherein the elevated temperature is at least 30 ° C.

7. The process of claim 1, wherein the leaching is conducted at ambient temperature.

8. The process of claim 1, wherein the material comprises ores, concentrates or tailings.

9. The process of claim 1, wherein the process comprises heap leaching, in-situ leaching, in-place leaching, vat leaching or tank leaching.

10. The process of claim 1, wherein the amino acid derivative comprises a peptide.

11. The process of claim 1, wherein the concentration of amino acid in the leaching solution is at least 0.001 M and is a maximum of 2 M.

12. The process of claim 1, wherein the pH is within a range from 9 to 13.

13. The process of claim 1, wherein the pH is above 10.

14. A differential leaching process for recovery of copper and precious metal from a copper and precious metal containing material, including the steps of:
   leaching the copper and precious metal containing material with an alkaline solution containing a lixiviant comprising an amino acid or derivative thereof under first conditions comprising ambient temperature and/or the absence of an oxidant in order to produce a copper containing leachate and precious metal containing residue;
   leaching the precious metal containing residue with an alkaline solution containing a lixiviant comprising an amino acid or derivative thereof under second conditions comprising elevated temperature and/or the presence of an oxidant, in order to produce a precious metal containing leachate;
   extracting the copper from the copper containing leachate; and
   extracting the precious metal from the precious metal containing leachate.

15. A process for recovery of metal comprising copper and/or a precious metal from a metal containing material, including the steps of:
   leaching the metal containing material with an aqueous alkaline solution containing a lixiviant comprising an amino acid derivative in order to produce a metal containing leachate, wherein the amino acid derivative comprises a peptide; and
   extracting the metal from the leachate.

* * * * *